United States Patent
Huber

(10) Patent No.: US 9,416,986 B2
(45) Date of Patent: *Aug. 16, 2016

(54) VALVE FOR ROOF VENT

(71) Applicant: The RectorSeal Corporation, Houston, TX (US)

(72) Inventor: Kevin Huber, Tacoma, WA (US)

(73) Assignee: The RectorSeal Corporation, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/580,068

(22) Filed: Dec. 22, 2014

(65) Prior Publication Data

US 2015/0198343 A1 Jul. 16, 2015

Related U.S. Application Data

(63) Continuation-in-part of application No. 14/210,103, filed on Mar. 13, 2014, now Pat. No. 9,010,363, which is a continuation-in-part of application No. 14/082,018, filed on Nov. 15, 2013, now abandoned.

(Continued)

(51) Int. Cl.
*F16K 24/00* (2006.01)
*F24F 7/02* (2006.01)
(Continued)

(52) U.S. Cl.
CPC . *F24F 7/02* (2013.01); *E03F 5/042* (2013.01); *F16K 15/031* (2013.01); *F16K 17/19* (2013.01);
(Continued)

(58) Field of Classification Search
CPC ............... Y10T 137/6969; Y10T 137/6988; Y10T 137/7838; F16K 15/031; E03F 2005/0417; E03F 5/042
USPC .............................................. 137/512.1, 527
See application file for complete search history.

(56) References Cited

U.S. PATENT DOCUMENTS

| 155,669 A | 10/1874 | Painter |
| 171,817 A | 1/1876 | Kahl |

(Continued)

FOREIGN PATENT DOCUMENTS

| CH | 313441 A | 5/1956 |
| DE | 101 10 525 A1 | 9/2002 |

(Continued)

OTHER PUBLICATIONS

International Search Report & Written Opinion for PCT/US2014/043488 dated Jan. 13, 2015.

(Continued)

*Primary Examiner* — Kevin Lee
*Assistant Examiner* — P. Macade Nichols
(74) *Attorney, Agent, or Firm* — Knobbe Martens Olson & Bear LLP

(57) ABSTRACT

A valve allows for drainage of gases while preventing backflow of gases from a drainage system through the valve. A drain can have a first, sealed position in which a component of the valve seals an opening through the valve and a second, open position in which the component of the valve is separated from the opening to allow a fluid to drain through the valve. When the fluid has drained through, the component of the valve can return to the closed position. The valve can include a pressure relief conduit to help equalize pressure across the valve and permit unrestrained draining of fluid through the valve. The valve can be positioned in a roof vent and can include a guard.

22 Claims, 17 Drawing Sheets

Related U.S. Application Data

(60) Provisional application No. 62/082,112, filed on Nov. 19, 2014, provisional application No. 62/091,574, filed on Dec. 14, 2014, provisional application No. 62/094,860, filed on Dec. 19, 2014, provisional application No. 61/878,349, filed on Sep. 16, 2013, provisional application No. 61/838,826, filed on Jun. 24, 2013.

(51) Int. Cl.

| | | |
|---|---|---|
| *F24F 13/10* | (2006.01) | |
| *E03F 5/042* | (2006.01) | |
| *F16K 15/03* | (2006.01) | |
| *F16K 17/19* | (2006.01) | |
| *E03C 1/122* | (2006.01) | |
| *E03F 5/04* | (2006.01) | |
| *F24F 13/22* | (2006.01) | |

(52) U.S. Cl.
CPC ............... *F24F 13/10* (2013.01); *E03C 1/1225* (2013.01); *E03F 2005/0417* (2013.01); *F24F 2013/227* (2013.01); *Y10T 137/6988* (2015.04); *Y10T 137/7838* (2015.04)

(56) References Cited

U.S. PATENT DOCUMENTS

| | | |
|---|---|---|
| 194,329 A | 8/1877 | Buhrer |
| 555,588 A | 3/1896 | Spencer |
| 803,979 A | 11/1905 | Bonnell |
| 1,137,516 A | 4/1915 | Moon |
| 1,628,069 A | 5/1927 | Muller et al. |
| 1,720,819 A | 7/1929 | Cohen |
| 1,749,098 A | 3/1930 | Boosey |
| 1,771,770 A | 7/1930 | Bruno |
| 1,867,478 A | 7/1932 | Stelzner |
| 1,948,220 A | 2/1934 | Kennedy |
| 2,049,340 A | 7/1936 | Van Der Horst et al. |
| 2,068,248 A | 1/1937 | Schroeder |
| 2,132,636 A | 10/1938 | Maahs |
| 2,211,212 A | 8/1940 | Langdon |
| 2,270,737 A | 1/1942 | Langdon |
| 2,279,257 A | 4/1942 | Svirsky |
| 2,292,003 A | 8/1942 | Yant et al. |
| 2,299,116 A | 10/1942 | Svirsky |
| 2,299,434 A | 10/1942 | Svirsky |
| 2,322,631 A | 6/1943 | Groeniger |
| 2,348,097 A | 5/1944 | Smith |
| 2,369,939 A | 2/1945 | Betts |
| 2,371,449 A | 3/1945 | Langdon |
| 2,511,435 A | 6/1950 | Griswold |
| 2,516,578 A | 7/1950 | Kreiner |
| 2,520,771 A | 8/1950 | Martin et al. |
| 2,524,764 A | 10/1950 | Burke |
| 2,562,533 A | 7/1951 | Dunlap |
| 2,578,590 A | 12/1951 | Perrault |
| 2,579,855 A | 12/1951 | Pockel et al. |
| 2,594,318 A | 4/1952 | Langdon |
| 2,596,182 A | 5/1952 | Sosaya |
| 2,598,002 A | 5/1952 | Langdon |
| 2,629,393 A | 2/1953 | Langdon |
| 2,646,063 A | 7/1953 | Hayes |
| 2,655,178 A | 10/1953 | Sarosdy |
| 2,675,823 A | 4/1954 | Langdon |
| 2,725,075 A | 11/1955 | Irgens |
| 2,777,464 A | 1/1957 | Mosely |
| 2,787,376 A | 4/1957 | Coulson |
| 2,912,999 A | 11/1959 | Kersh |
| 2,913,000 A | 11/1959 | Roberts |
| 2,922,380 A | 1/1960 | Pedlow, Jr. |
| 2,927,609 A | 3/1960 | Vanderlans |
| 2,928,413 A | 3/1960 | Hansen |
| 2,936,779 A | 5/1960 | Kindred |
| 2,997,050 A | 8/1961 | Ferguson |
| 3,047,013 A | 7/1962 | Baumbach |
| 3,059,637 A | 10/1962 | Senne |
| 3,060,882 A | 10/1962 | Peters et al. |
| 3,091,259 A | 5/1963 | Alessio |
| 3,107,687 A | 10/1963 | Howe |
| 3,116,751 A | 1/1964 | Hamilton |
| 3,118,468 A | 1/1964 | Bochan |
| 3,132,685 A | 5/1964 | Mc Kinnon |
| 3,154,106 A | 10/1964 | Nooy |
| 3,228,418 A | 1/1966 | Rosback et al. |
| 3,241,571 A | 3/1966 | Garcia |
| 3,268,018 A | 8/1966 | Neilson |
| 3,312,237 A | 4/1967 | Mon |
| 3,319,268 A | 5/1967 | Blumenkranz |
| 3,327,379 A | 6/1967 | Clements |
| 3,335,741 A | 8/1967 | Liljendahl |
| 3,354,903 A | 11/1967 | Caruso |
| 3,392,409 A | 7/1968 | Politz |
| 3,442,295 A | 5/1969 | Ver Nooy |
| 3,448,766 A | 6/1969 | Schule |
| 3,457,959 A | 7/1969 | Cooper |
| 3,463,189 A | 8/1969 | Fitzpatrick |
| 3,467,271 A | 9/1969 | Kaiser et al. |
| 3,519,012 A | 7/1970 | Van Patten |
| 3,542,057 A | 11/1970 | Staiano |
| 3,605,132 A | 9/1971 | Lineback |
| 3,610,270 A | 10/1971 | Attle |
| 3,707,986 A | 1/1973 | Breen |
| 3,712,115 A | 1/1973 | Miller |
| 3,730,218 A | 5/1973 | Rydberg |
| 3,762,437 A | 10/1973 | King, Sr. |
| 3,766,947 A | 10/1973 | Osburn |
| 3,768,505 A | 10/1973 | Benke |
| 3,775,780 A | 12/1973 | McEwen |
| 3,822,720 A | 7/1974 | Noyce |
| 3,858,604 A | 1/1975 | Bender et al. |
| 3,911,949 A | 10/1975 | Hilden et al. |
| 3,919,880 A | 11/1975 | Seyd et al. |
| 3,941,156 A | 3/1976 | Metzger |
| 3,952,340 A | 4/1976 | Cuschera |
| 3,969,847 A | 7/1976 | Campagna et al. |
| 3,990,439 A | 11/1976 | Klinger |
| 4,009,366 A | 2/1977 | Danell |
| 4,040,450 A | 8/1977 | Boundy |
| 4,052,759 A | 10/1977 | Hill |
| 4,054,152 A | 10/1977 | Ito et al. |
| 4,064,912 A | 12/1977 | Petrone |
| 4,086,668 A | 5/1978 | Tubbs |
| 4,088,149 A | 5/1978 | Logsdon |
| 4,098,287 A | 7/1978 | Baumbach |
| 4,132,111 A | 1/1979 | Hasha |
| 4,132,241 A | 1/1979 | Iannelli |
| 4,142,371 A | 3/1979 | Mayfield |
| 4,163,509 A | 8/1979 | Amneus |
| 4,168,621 A | 9/1979 | Kreitenberg |
| 4,175,592 A | 11/1979 | Coone |
| 4,180,875 A | 1/1980 | Wilson |
| 4,192,339 A | 3/1980 | Fisher |
| 4,194,252 A | 3/1980 | Tsuei |
| 4,194,721 A | 3/1980 | Nachtigahl |
| 4,202,377 A | 5/1980 | Harrison |
| 4,203,473 A | 5/1980 | Roberson, Sr. |
| 4,212,486 A | 7/1980 | Logsdon |
| 4,222,407 A | 9/1980 | Ruschke et al. |
| 4,232,704 A | 11/1980 | Becker et al. |
| 4,232,706 A | 11/1980 | Ericson |
| 4,289,166 A | 9/1981 | Haines |
| 4,296,778 A | 10/1981 | Anderson |
| 4,306,447 A | 12/1981 | Franks, Jr. |
| 4,376,597 A | 3/1983 | Britton et al. |
| 4,406,480 A | 9/1983 | Izzi |
| 4,407,171 A | 10/1983 | Hasha et al. |
| 4,416,308 A | 11/1983 | Bower |
| 4,423,526 A | 1/1984 | Izzi, Sr. |
| 4,429,568 A | 2/1984 | Sullivan |
| 4,436,107 A | 3/1984 | Persson |
| 4,460,019 A | 7/1984 | Condon |
| 4,494,575 A | 1/1985 | Gladstone |
| 4,518,014 A | 5/1985 | McAlpine |

(56) References Cited

U.S. PATENT DOCUMENTS

| | | |
|---|---|---|
| 4,535,807 A | 8/1985 | Ericson |
| 4,538,508 A | 9/1985 | Ballard |
| 4,542,642 A | 9/1985 | Tagliarino |
| 4,556,084 A | 12/1985 | Frawley |
| 4,593,504 A | 6/1986 | Bonnici et al. |
| 4,594,739 A | 6/1986 | Watts et al. |
| 4,602,504 A | 7/1986 | Barber |
| 4,607,664 A | 8/1986 | Carney et al. |
| 4,610,246 A | 9/1986 | Delphia |
| 4,624,131 A | 11/1986 | Holm et al. |
| 4,632,151 A | 12/1986 | Glover |
| 4,658,861 A | 4/1987 | Roberson, Sr. |
| 4,669,131 A | 6/1987 | Barlow |
| 4,706,482 A | 11/1987 | Barber |
| 4,712,574 A | 12/1987 | Perrott |
| 4,729,401 A | 3/1988 | Raines |
| 4,744,109 A | 5/1988 | Yuill |
| 4,756,982 A | 7/1988 | McCartney, Jr. |
| 4,762,149 A | 8/1988 | Pickl, Jr. |
| 4,763,510 A | 8/1988 | Palmer |
| 4,780,915 A | 11/1988 | Cuschera |
| 4,821,559 A | 4/1989 | Purpora |
| 4,823,411 A | 4/1989 | Nettel |
| 4,827,539 A | 5/1989 | Kiziah |
| 4,836,151 A | 6/1989 | Litjens et al. |
| 4,838,262 A | 6/1989 | Katz |
| 4,848,155 A | 7/1989 | Huber |
| 4,870,992 A | 10/1989 | Irwin et al. |
| 4,873,730 A | 10/1989 | Cuschera |
| 4,887,646 A | 12/1989 | Groves |
| 4,890,483 A | 1/1990 | Vetter |
| 4,936,338 A | 6/1990 | Fonoimoana |
| 4,936,350 A | 6/1990 | Huber |
| 4,955,167 A | 9/1990 | Holtgreve |
| 5,005,328 A | 4/1991 | Holtgreve |
| 5,005,603 A | 4/1991 | Amundson et al. |
| 5,014,739 A | 5/1991 | Csaszar |
| 5,033,510 A | 7/1991 | Huber |
| 5,070,896 A | 12/1991 | Warren |
| 5,076,095 A | 12/1991 | Erhardt |
| 5,099,887 A | 3/1992 | Hooper |
| 5,115,554 A | 5/1992 | Fell, Sr. |
| 5,159,953 A | 11/1992 | Sato et al. |
| 5,163,480 A | 11/1992 | Huber |
| 5,181,543 A | 1/1993 | Hendzel |
| 5,277,171 A | 1/1994 | Lannes |
| 5,287,730 A | 2/1994 | Condon |
| 5,297,581 A | 3/1994 | Godfrey |
| 5,301,707 A | 4/1994 | Hofsteenge |
| 5,323,641 A | 6/1994 | Tolliver et al. |
| 5,323,804 A | 6/1994 | Lin |
| 5,325,885 A | 7/1994 | Ivan et al. |
| 5,330,437 A | 7/1994 | Durman |
| 5,377,361 A | 1/1995 | Piskula |
| 5,419,359 A | 5/1995 | Kor |
| 5,441,679 A | 8/1995 | Chalich |
| 5,507,501 A | 4/1996 | Palmer |
| 5,518,026 A | 5/1996 | Benjey |
| 5,601,112 A | 2/1997 | Sekiya et al. |
| 5,606,995 A | 3/1997 | Raftis |
| 5,623,971 A | 4/1997 | Foernzler |
| 5,662,138 A | 9/1997 | Wang |
| 5,709,309 A | 1/1998 | Gallagher et al. |
| 5,727,593 A | 3/1998 | Duer |
| 5,740,830 A | 4/1998 | Mankins |
| 5,797,426 A | 8/1998 | Powell |
| 5,803,112 A | 9/1998 | Andersson |
| 5,844,127 A | 12/1998 | Berube et al. |
| 5,927,762 A | 7/1999 | Webb |
| 5,966,884 A | 10/1999 | Uglow |
| 5,996,134 A | 12/1999 | Senninger |
| 6,032,515 A | 3/2000 | Huber |
| 6,082,183 A | 7/2000 | Huber |
| 6,085,362 A | 7/2000 | Huber |
| 6,085,363 A | 7/2000 | Huber |
| 6,102,794 A | 8/2000 | Cline |
| 6,209,584 B1 | 4/2001 | Huber |
| 6,234,195 B1 | 5/2001 | Kippe et al. |
| 6,234,198 B1 | 5/2001 | Chalich |
| 6,237,625 B1 | 5/2001 | Randolph |
| 6,273,124 B1 | 8/2001 | Huber et al. |
| 6,318,397 B1 | 11/2001 | Huber et al. |
| 6,367,505 B1 | 4/2002 | Raftis et al. |
| 6,415,816 B1 | 7/2002 | Beckey et al. |
| 6,532,988 B1 | 3/2003 | Ericson |
| 6,626,201 B1 | 9/2003 | Kim |
| 6,719,003 B2 | 4/2004 | Schroeder et al. |
| 6,719,004 B2 | 4/2004 | Hubert |
| 6,827,105 B1 | 12/2004 | Marble et al. |
| 6,994,622 B2 | 2/2006 | Koessler |
| 7,270,146 B1 | 9/2007 | Johnston et al. |
| 7,509,978 B1 | 3/2009 | Currid |
| 7,900,288 B2 | 3/2011 | Fima |
| 8,136,548 B2 | 3/2012 | Trueb |
| 8,201,576 B2 | 6/2012 | Klein |
| 8,205,401 B2 | 6/2012 | Ward |
| 9,010,363 B2 * | 4/2015 | Huber ............... E03F 5/0407 137/512.1 |
| 9,139,991 B2 | 9/2015 | Huber |
| 2001/0050106 A1 | 12/2001 | Turker et al. |
| 2006/0011239 A1 | 1/2006 | Stone |
| 2009/0320936 A1 | 12/2009 | Brunner |
| 2012/0152388 A1 | 6/2012 | Stanaland |
| 2012/0192950 A1 | 8/2012 | Huber |
| 2013/0032746 A1 | 2/2013 | Huber |
| 2014/0373931 A1 | 12/2014 | Huber |
| 2014/0373943 A1 | 12/2014 | Huber |

FOREIGN PATENT DOCUMENTS

| | | |
|---|---|---|
| EP | 0409506 A1 | 1/1991 |
| IT | 495000 A | 6/1954 |
| WO | WO 96/19620 A1 | 6/1996 |
| WO | WO 2010/088734 A1 | 8/2010 |
| WO | WO 2011/047437 A1 | 4/2011 |

OTHER PUBLICATIONS

Dezurik APCO Hilton; APCO Rubber Flapper Swing Check Valves (CRF), available online: http://www.dezurik.com/products/product-line/check-valves/rubber-flapper-swing-check-valves-crf/8/38/; Date Accessed: Nov. 6, 2014; 1 page.

Johns Manville; FP-10 One-Way® Roof Vent, available online: http://www.specjm.com/products/specialty/onewayroofvent.asp; Date Accessed: Nov. 5, 2014; 2 pages.

Platinum Technologies Ltd.; Insulated One-way breather, available online: http://www.platinumtechnoloies.com/13008.html; Date Accessed: Nov. 5, 2014; 2 pages.

PlumbingSupply.com; PVC & ABS Air Admittance Valves (AAV's) by Ayrlett, available online: https://www.plumbingsupply.com/autovent.html; Date Accessed: Nov. 5, 2014; 2 pages.

ReevesJournal.com; 2014 Manufacturer's Spotlight—SureSeal, available online: http://digital.bnpmedia.com/publication/?i=215721&p=46; Date Accessed: Jan. 4, 2016; 3 pages.

* cited by examiner

VALVE FOR ROOF VENT

CROSS-REFERENCE TO RELATED APPLICATIONS

This application claims priority to U.S. Provisional Application Ser. No. 62/082,112, filed Nov. 19, 2014; U.S. Provisional Application Ser. No. 62/091,574, filed Dec. 14, 2014 and U.S. Provisional Application Ser. No. 62/094,860 filed Dec. 19, 2014; and this application is also a continuation in part of U.S. patent application Ser. No. 14/210,103, filed Mar. 13, 2014, and issued as U.S. Pat. No. 9,010,363, which is a continuation in part of U.S. patent application Ser. No. 14/082,018, filed Nov. 15, 2013, which claims priority to U.S. Provisional Application Ser. No. 61/878,349, filed Sep. 16, 2013 and U.S. Provisional Application Ser. No. 61/838,826, filed Jun. 24, 2013;

the disclosures of all of the above-listed priority applications are hereby incorporated herein by reference in their entirety.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Field of the Disclosure

The present disclosure relates in general to valves that can be used to provide one way flow of fluids such as gases or fluids. Such valves can be used, for example, in floor drains, such as valves useful in drains for buildings, floors, basements, exterior paved areas or other areas that require drainage, as well as for urinals and other waste handling devices connected to a sewer or drain conduit. Such valves can also be used in building vents, such as roof vents or tubing or piping used as part of a heating, ventilation, air conditioning, and/or refrigeration system.

2. Description of the Related Art

Floor drains are frequently used with a trap that catches a volume of water in such a way that direct access for gas from the drain system to the area above the floor drain is blocked but that allows passage of the water. Floor drains are available in many shapes and are used in laundry rooms, bathrooms, shower spaces etc. for the draining of water. Traditionally, U-shaped or "gooseneck" traps have been used in the plumbing industry to prevent backflow of harmful or undesirable sewer or pipe gases into buildings while permitting drainage of unwanted liquid from floors and other generally horizontal surfaces. Such traps operate by leaving a small quantity of fluid within the lower portion of a U-shaped trap section to act as a gas barrier. In many applications, however, particularly where access is difficult or where drainage is infrequent, gooseneck traps are not optimal due to insufficient space to install and to inaccessability. Fluid in gooseneck trap may evaporate from the trap, permitting free flow of obnoxious gasses through the drain, insects may breed in the fluid, or in some instances the fluids may harden so as to actually block or restrict flow through the drain.

For water to drain freely out of a house waste system there must be adequate venting. The venting performs various functions. For instance, venting allows air in front of the water rushing through the waste pipe to be pushed out of the way. Venting also allows air to be reintroduced to the waste piping after the water has gone by. Venting further allows sewer gases to escape outside through a vent stack (also sometimes referred to as "roof vent" or "vent pipe") which extends out through the roof. The vent stack normally should extend at least six inches up through the roof of the house.

SUMMARY OF THE DISCLOSURE

In some cases, roof vents terminates in the attic which may allow odors to find their way into the house and/or even if the roof vent extends from the roof odors can be noticed. Accordingly, various valve embodiments described herein are configured to provide a valve that prevents or substantially prevents the backflow of gases in one direction while permitting liquids or gases to flow through the valves in a different direction. It is understood that various embodiments described herein can be used as drain valves that prevent or substantially prevent backflow of large quantities of gases from the drain or sewer while permitting liquids to flow downwardly into the drain or sewer. It is further understood that various embodiments can be used in other applications, such as for use in building vents, such as roof vents or tubing or piping used as part of a heating, ventilation, air conditioning, and/or refrigeration system for the building, recreational vehicle (e.g., RV) and/or motor homes.

For example, in one embodiment described herein, a roof vent valve is provided that has a one way valve that allows air to flow into the roof vent system to, for example, provide venting in front of the water rushing through the waste pipe to be pushed out of the way. The one way valve can also allow air to be reintroduced to the waste piping after the water has gone by. The one way valve can be useful in preventing or limiting odors from escaping outside through the vent stack (also sometimes referred to as "roof vent" or "vent pipe") which extends out through the roof or into the attic. In one embodiment, the one way valve comprises a flapper that will only open in one direction, thus preventing odors and gases under normal conditions from flowing up out of the vent (e.g., into the attic or above the roof). In other embodiments, the one way valve can comprise a ball valve, duck bill valve, check valve and/or other type of one way valve system. In some embodiments, additionally, if the pressure in the vent system exceeds a predetermined amount, the roof vent valve can provided with a pressure relief valve and pressure equalization conduit that allows gases to escape once a sufficient pressure is reached. The one-way valve can include a vent guard that can attach or be coupled to the top of the valve to prevent debris from interfering with the operation of the roof vent valve.

Various valve embodiments described herein are configured to provide a roof vent valve that includes a pressure equalization conduit with, for example, a ball valve, said conduit extending from below to above the roof vent valve, the ball valve structure being used to close the pressure relieving conduit for pressure testing of the drain or sewer below the valve. In other embodiments, the pressure equalization conduit can include a different type of one way valve, such as for example, a lift valve, a flapper valve, check valve, duck bill valve, etc.

Various roof vent valve embodiments described herein are configured to provide improved effectiveness, manufacturability, simplicity and reliability for roof vent and the like.

Various roof vent valve embodiments described herein are configured to provide a valve housing having the upper portion thereof formed to permit expansion outwardly into engagement with the interior of a roof vent to secure the roof vent housing in place and prevent elevated pressures beneath the roof vent housing from dislodging the valve housing from its operative position.

Various embodiments of roof vent valves described herein can include check valves that allow for entry of fluids while preventing backflow gases and/or odors from a venting system through the roof vent valve. In some embodiments, a check valve can have a first, sealed position in which a component of the check valve seals an opening through the valve and a second, open position in which the component of the check valve (such as a flapper) is separated from the opening to allow a air to enter into the venting system. When the air has entered the venting system, the component of the valve can return to the closed position. In some embodiments, the valve can be configured to resist back pressure in the system, such as during storm events or to allow for back pressure testing of the drain system downstream of the valve for leaks and other anomalies. Thus, back pressure testing can occur without having to remove the valve and block the vent with a separate device, as is typically done.

In some embodiments, the roof vent valve can include a closure, preferably light in weight, positioned at the top of the conduit connecting a zone below a flapper (or other valve element) with a zone above the flapper. The closure is raised by a very small amount of pressure and permits gas to flow from the area below the flapper to the area above the flapper. For floor drain applications, this embodiment is generally used in situations where the back pressure needs to be equalized across the flapper so that the flapper will open whenever water, even in small quantities, flows into the valve. In some embodiments, the valve may not provide the capability of back pressure testing, such as for testing the sewer or pipe below the valve.

In some embodiments, the valve can be functionally similar to the prior described embodiment, but can incorporate a ball valve at the bottom of the conduit. The ball valve may be closed by the presence of water (or substantial gas flow) flowing backward, such as from the water filled "P trap" used in drain or sewer systems. The ball valve, which is positioned below the flapper in the conduit, can connect the zone of the valve structure below the flapper with the zone of the valve structure above the flapper so that the valve may be sealed to back pressure, thereby permitting pressure testing of the sewer or piping below the valve. It may not be necessary to remove the ball valve structure after the installation of the flapper valve, since it can operate in the same fashion as the prior described embodiments so long as the ball is not raised by the presence of water below the flapper.

In some embodiments, a valve flapper can include an elastomeric hinge that connects a mounting structure with the flapper. The elastomeric hinge urges the flapper into a normally closed position against the flapper seat while permitting the flapper to open when water flows down on the upper surface of the flapper (e.g., in floor drain applications). The flapper is positioned, using a keeper which is preferably removable, in a flapper mount. The flapper mount is positioned at an angle to bias the elastomeric hinge upwardly so that the flapper is held against the flapper seat when at rest without downwardly moving water. The flapper mount preferably holds the flapper at an angle relative to the horizontal.

In various embodiments, valves as described herein may utilize an expansion device, such as a securing and sealing ring, preferably at the upper portion of the valve body to secure the valve body in operative position within, for example, a drain conduit. In certain arrangements, water can flow through an opening in the expansion device and/or the expansion device can be partially closed with passages for water to flow through. An alternative securing and sealing structure contemplated herein is a gasket structure having an inflatable void extending partially or completely around the outer wall of the valve body. Inflation of the gasket structure would force the periphery of the gasket into a secure sealing against the interior of, for example, the drain conduit and would prevent the valve body from being dislodged whenever pressure is applied in the conduit downstream of the valve body. Other securing and/or sealing structures can be used, including snap locks, such as bale-and-gasket snap locks similar to those used on mason jars, inflatable sealing locks, and multi-layered locks with two outer rigid layers that can compress a resilient middle layer such that it expands outward to lock. In some embodiments, a securing and/or sealing structure can be separate from the valve body.

In certain conditions of operation, back pressure in the system may hinder the opening of a check valve. In some embodiments, it can be desirable to provide some form of pressure equalization in order to permit unrestricted opening of the valve. Such a form of pressure equalization can, during normal operation or the check valve, help equalize pressure across the valve (e.g., equalize pressure on both sides of a valve flapper) when necessary but still prevent backflow of undesirable gases once the pressure has been equalized. By helping equalize pressure, normal operation of the check valve can be ensured. Additionally, equalizing pressure can ensure that the check valve can open at pressures consistent with regulatory standards.

In some embodiments, inclusion of a pressure equalization system can allow backflow of fluids in addition to allowing for the release of gases needed to equalize pressure. Thus, in some embodiments, where a system design is desired to include prevention of backflow during high pressure events, such as to perform back pressure testing, a valve can include a pressure equalization valve or system and also include an additional valve to block backflow during high pressure events.

In some embodiments, to prevent a valve structure from being forced upwardly by pressure below the valve a securing and sealing system such as a rotatable ring threaded to expand the upper zone of the valve body into contact with the inner wall of a drain conduit is provided. The ring can cause the upper portion of the drain valve body to be expanded into secure frictional engagement with the drain housing in which the valve is installed. Other means to hold the valve body in place are contemplated as well. In some embodiments, a gasket surrounding the drain valve body is provided to securely seal the drain valve body within a drain housing.

In some embodiments, a valve allows for the equalization of pressure above and below the flapper of a check valve without providing the ability to block backflow of high pressures to thereby allow for pressure testing the sewer or pipe below the valve. The drain valve can include a light weight closure positioned in a pressure relief conduit connecting a zone below the flapper with a zone above the flapper. The closure can be raised by a very small amount of pressure and permit gas to flow from the area below the flapper to the area above the flapper. Such embodiments are generally used in situations in which the back pressure needs to be equalized across the flapper so that the flapper will open whenever fluid, even in small quantities, flows into the drain valve.

In some embodiments, a valve can prevent fluid backflow during normal conditions and during high pressure conditions, such as when testing back pressure in the system. In some embodiments, the valve can have just a flapper that operates as a check valve to permit fluid to flow through the valve in a first direction but not in an opposing direction. In some embodiments, the valve can have a pressure relief and also an additional valve to prevent fluid backflow during normal operating conditions and to permit pressure testing of the drain or sewer system beneath the valve. The additional valve can be, for example, a ball valve with a lightweight closure that houses a ball or a flapper valve in certain arrangements. The ball valve can be positioned in the pressure relief conduit and can be closed by the presence of a strong backflow pressure. The ball valve can connect the zone of the valve structure below the flapper with the zone of the valve structure above the flapper so that the valve may be sealed against high back pressures, thereby permitting pressure testing of the sewer or piping below the valve. At low back pressures, the ball valve can remain open and allow for pressure equalization.

In some embodiments, a valve flapper can include an elastomeric hinge that connects a mounting structure with the flapper. The elastomeric hinge can urge the flapper into a normally closed position against a flapper seat while permitting the flapper to open when fluid flows onto the upper surface of the flapper. The flapper can be secured to the flapper mount using a mounting bracket or clip. The flapper can be mounted at an angle to bias the elastomeric hinge upwardly so that the flapper is held against the flapper seat when at rest without downwardly moving water. The flapper mount preferably holds the flapper at an angle relative to the horizontal.

Various embodiments described herein may utilize an expansion device, such as a securing and sealing ring, to help secure the valve body in an operative position within the conduit. In some embodiments, a valve can include a gasket structure having an inflatable membrane extending partially or completely around the outer wall of the valve body. Inflation of the gasket structure can force the periphery of the membrane into a secure sealing position against the interior of the conduit and can prevent the valve body from being dislodged whenever pressure is applied in the conduit downstream of the valve body.

In some embodiments, a securing and/or sealing ring can be adapted for rotational installation in which a threaded exterior of the sealing ring engages and expands the upper portion of the valve body. The upper portion may be formed of elastomeric material or alternatively the rigid valve body may have the upper portion thereof slotted to permit outward expansion thereof into secure engagement with the conduit. This secure engagement with, for example, the floor drain housing prevents pressure beneath the valve body from ejecting the valve body upwardly from the floor drain housing. In some embodiments, the upper portion can be separate from a lower portion of the valve body.

In some embodiments, a securing and sealing ring can incorporate a tapered threaded portion which engages a threaded portion of the valve body to cause an upper portion of the valve body to expand when the ring is rotated. The securing and sealing means may be incorporated into the valve body exterior or may be a securing and sealing device which is separately placed into the conduit in structural contact with the valve body.

The preferred securing and sealing ring is adapted for rotational installation in which a threaded exterior of the sealing ring engages and expands the upper portion of the valve body. The upper portion may be formed of elastomeric material or alternatively the rigid valve body may have the upper portion thereof slotted to permit outward expansion thereof into secure engagement with the conduit. This secure engagement with, for example, the floor drain housing prevents pressure beneath the valve body from ejecting the valve body upwardly from the floor drain housing.

Various embodiments described herein provide a method of draining a floor or other area, which includes a pressure testing configuration, by preventing the backflow of fluid (gas or liquid) under pressure thereby permitting pressure testing of the conduit downstream of the drain valve. A securing and sealing means may be incorporated into the valve body exterior or may be a securing and sealing device which is separately placed into the drain conduit in structural contact with the valve body.

The present disclosure also provides a method of draining a floor while preventing the backflow of gas under pressure thereby permitting pressure testing of the conduit downstream of the valve. The method according to one embodiment includes the step of positioning a flapper within a cylindrical body such that a peripheral edge of the rigid flapper adjacent an inlet of the cylindrical body is resiliently and flexibly attached to the cylindrical body by a resilient hinge having an indexing embossment fitting into an indexing groove for positive placement of the flapper. The indexing embossment also serves to distribute forces exerted by back pressure upon the flapper thereby maintaining the flapper in its position when sealed against a valve seat. A peripheral edge of the rigid flapper adjacent the outlet of the cylindrical body is urged into sealing relationship with a sealing surface on a valve seat but is free to deflect towards the outlet to open the valve permitting downward flow of liquids therethrough. In addition the valve configuration is adapted to resist back pressure from the drain so that the drain may be tested for leakage. The features of the present disclosure are described in greater detail below.

In various embodiments, a check valve can include a cylindrical body, including an inlet end and an opposed outlet end; a resilient flapper mount connected to an inside surface of the cylindrical body, said flapper mount having an indexing groove extending across a substantial portion of said mount; a flapper stop positioned on the inside surface of the cylindrical body between the flapper mount and the outlet end of the cylindrical body; and a flapper connected to said flapper mount, said flapper having a mounting flange with an indexing ridge for insertion into said indexing groove, said flapper being rotatable upon an elastomeric hinge from a first closed position engaged with the flapper stop to allow liquid that enters the inlet to exit the check valve through the outlet and when in the closed position prevents backflow of gases.

In various embodiments, a check valve assembly can include a drain basin configured to be inserted into a floor, the drain basin including an upper end and a lower end, wherein the area of the upper end is greater than the area of the lower end. The assembly can include a check valve configured to be secured between the upper and lower ends of the drain basin, the check valve being configured to be inserted and removed from the drain basin from the upper end of the drain basin. In some embodiments, the check valve can including a cylindrical body, including an inlet end and an opposed outlet end, a flapper seat, and a relatively rigid flapper having a mounting tab with indexing ridge and resilient hinge. In some embodiments, the check valve can be positioned below the assembly. The flapper can be mounted upon the flapper mount and positioned within the cylindrical body at an angle and urged into sealing contact with the seat by the resilient hinge. A portion of an upper periphery edge of the flapper can be connected to the cylindrical body, and a portion of a lower peripheral edge can be configured to deflect to allow fluid to pass through the cylindrical body of the check valve. Liquids may pass downwardly through the check valve and gases from below the check valve are prevented from upward movement.

In various embodiments, a valve can include a substantially cylindrical outer housing configured to fit within a drain conduit, and a substantially cylindrical inner housing connected with the outer housing. The valve can include a flapper seat having an aperture connected to an inner surface of the inner housing, a flapper positioned at the aperture, and a flapper mount having an aperture configured to receive an alignment pin and hold the flapper against the flapper seat. A conduit can attach to the inner housing and extend from an area below the flapper to an area above the flapper. A closure can be positioned at the top of the conduit, the closer being raised under pressure to permit gas to flow from the area below the flapper to the area above the flapper. A shield can connect to the inner housing and be adapted to cover the closure. An elastomeric hinge can connect the shield with the flapper seat and allow the flapper to pivot, thereby allowing fluid to pass through the inner housing. The closure can also be configured to provide equalization of pressure above and below the flapper to thereby allow the flapper to open when fluid flows into the valve.

In various embodiments, a valve can include a drain valve housing configured to fit within a drain conduit, the drain valve housing including an inlet, an outlet, and a valve seat. A flapper can be mounted within the housing and have a first side facing a first side of the valve and a second side facing a second side of the valve, the flapper biased toward a closed position in which the first side of a sealing portion of the flapper engages with the valve seat to thereby block at least a portion of backflow through the drain housing. The flapper can also be configured such that a pressure on the first side of the flapper moves the flapper to an open position in which fluid can flow past the flapper. The drain valve can also include a pressure equalization conduit fluidly connecting a first side of the drain valve on the first side of the flapper with a second side of the drain valve on the second side of the flapper. A valve member can be within the pressure equalization conduit, the valve member configured to move from a closed position that substantially blocks fluid transfer between the first and second sides of the drain valve to an open position when a pressure on the second side of the drain valve exceeds a first defined pressure, thereby allowing the pressure on the second side of the drain valve to bleed into the first side of the drain valve.

In various embodiments, a valve can include a drain valve housing having an inlet and an outlet; a one way valve positioned within the drain valve housing, the one way valve configured to restrict backflow through the drain housing while allowing fluid to drain through the drain housing from the inlet to the outlet in a first direction; a pressure equalization conduit fluidly connecting a first side of the one way valve a second side of one way valve; and a valve member configured to move from a closed position that restricts fluid transfer between the first and second sides of the one way valve to an open position when a pressure on the second side of the one way valve exceeds a first defined pressure, thereby allowing the pressure on the second side of the one way valve to bleed into the first side of the one way valve.

In various embodiments, a valve can include a valve housing configured to fit within a drain conduit, the drain valve housing including an inlet, an outlet, a valve seat, and a flapper mount having an indexing indentation. The flapper can include a sealing section, an attachment section, and a resilient hinge between the sealing section and the attachment section. The attachment section can include an indexing protrusion configured to couple with the indexing indentation to thereby align the flapper such that the sealing section engages the valve seat when the flapper is in a closed position to substantially prevent backflow of fluids through the drain valve. The resilient hinge can bias the flapper toward the closed position, and the hinge can be configured such that a fluid passing through the inlet and applying a pressure on the flapper moves the flapper from the closed position to an open position in which the fluid can pass by the flapper and through the outlet.

In various embodiments, an expandable floor drain valve assembly can include a drain valve housing configured to fit within a drain conduit, the drain valve housing including an upper section defining an inlet, and a lower section defining an outlet. The upper section can include a plurality of flexible panels separated by slits, and at least a portion of the flexible panels can have internal threading. A valve member can be positioned within the drain valve housing and can be configured to allow fluid to flow through the drain valve housing from the inlet to the outlet but substantially block fluid from flowing through the drain valve housing from the outlet to the inlet. The assembly can also include an expansion ring having external threading, the expansion ring configured to be screwed into the upper section of the drain valve housing and to drive the flexible panels outward into engagement with the drain conduit as the expansion ring is screwed into the upper section to thereby tighten the drain valve within the drain conduit.

In various embodiments, a method of installing a drain valve into a drain conduit having a strainer mount can include providing a drain valve have a valve body and a flexible exterior gasket, wherein the gasket in an equilibrium position has a width greater than an inner diameter of the strainer mount and the valve body has a width smaller than the inner diameter of the strainer mount; deforming the gasket into a configuration sized to fit through the strainer mount of the drain conduit; inserting the gasket through the strainer mount and into said conduit; inserting the valve body through the strainer mount; positioning the valve body in the gasket; and positioning the valve body and gasket into an operational position within the drain conduit.

In various embodiments, a floor drain valve can include a drain valve housing comprising an inlet and an outlet. A one way valve can be positioned within the drain valve housing. The one way valve can be configured to restrict backflow through a flow channel of the drain housing from a second side of the one way valve to a first side of the one way valve while allowing fluid to drain through the flow channel of the drain housing from the first side of the one way valve to the second side of the one way valve. A pressure equalization conduit can fluidly connect the first side of the one way valve to the second side of one way valve. A valve member can move from a closed position that restricts fluid transfer through the pressure equalization conduit between the first and second sides of the one way valve to an open position when a pressure on the second side of the one way valve exceeds a first defined pressure, thereby allowing the pressure on the second side of the one way valve to bleed into the first side of the one way valve.

In various embodiments, a floor drain valve can include a drain valve housing configured to fit within a drain conduit. The drain valve housing can include an inlet, an outlet, a circumferential valve seat, and a flow channel passing through the valve and through the valve seat. A flapper is mounted within the housing and has a first side facing a first side of the valve and a second side facing a second side of the valve. The flapper is biased toward a closed position in which a sealing portion on the first side of the flapper engages with the valve seat to thereby block at least a portion of backflow through the flow channel. The flapper is configured such that a minimum pressure on the first side of the flapper moves the flapper to an open position in which fluid can flow through the flow channel. A pressure equalization conduit fluidly connects a first side of the drain valve on the first side of the flapper with a second side of the drain valve on the second side of the flapper. A valve member is within the pressure equalization conduit. The valve member is configured to move from a closed position that substantially blocks fluid transfer between the first and second sides of the drain valve to an open position when a pressure on the second side of the drain valve exceeds a first defined pressure, thereby allowing the pressure on the second side of the drain valve to bleed into the first side of the drain valve.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow. All of these embodiments are intended to be within the scope of the present disclosure. These and other embodiments will become readily apparent to those skilled in the art from the following detailed description of the preferred embodiments having reference to the attached figures, the invention not being limited to any particular preferred embodiment(s) disclosed or summary provided herein.

BRIEF DESCRIPTION OF THE DRAWINGS

Elements in the figures have not necessarily been drawn to scale in order to enhance their clarity and improve understanding of these various elements and embodiments described herein. Furthermore, elements that are known to be common and well understood to those in the industry are not depicted in order to provide a clear view of the various embodiments described herein, thus the drawings are generalized in form in the interest of clarity and conciseness.

DETAILED DESCRIPTION

In the following discussion that addresses a number of embodiments and applications, reference is made to the accompanying drawings that form a part hereof, and in which is shown by way of illustration specific embodiments in which the embodiments described herein may be practiced. It is to be understood that other embodiments may be utilized and changes may be made without departing from the scope of the disclosure.

Various inventive features are described below that can each be used independently of one another or in combination with other features. However, any single inventive feature may not address all of the problems discussed above or only address one of the problems discussed above. Further, one or more of the problems discussed above may not be fully addressed by the features of each embodiment described below.

FIGS. 1-11 and the accompanying description below are directed to valves that prevent or substantially prevent the backflow of fluid (e.g., liquid or gases) in one direction while permitting fluid (e.g., liquids or gases) to flow through the valves in a different direction. FIGS. 1-11 illustrate and the accompanying description may refer to the valve and the use of the valve in a floor drain. However, as described below, these valve embodiments can also be used in building vents, such as roof vents for plumbing systems. In such embodiments, the valve can be inserted into a vent stack and can allow air to flow into the roof vent system to, for example, provide venting in front of the water rushing through the waste pipe to be pushed out of the way. The one way valve can also allow air to be reintroduced to the waste piping after the water has gone by. The one way valve can be useful in preventing or limiting odors from escaping outside through the vent stack (also sometimes referred to as "roof vent" or "vent pipe") which extends out through the roof or into the attic. FIGS. 12A-14C illustrates an embodiment, which can also include a vent guard to protect and cover the valve. It is anticipated that the vent guard disclosed in FIGS. 12A-14C can also be used in combinations with the valve embodiments described with reference to FIGS. 1-11. In some embodiments, the vent guard vent disclosed and described with reference to FIGS. 12A-14C can be snap fitted or otherwise coupled to an upper portions of the valve embodiments described with reference to FIGS. 1-11 and, in other embodiments, the vent guard can be integrally formed, coupled with adhesive or otherwise attached to the upper portion.

Figure 1:
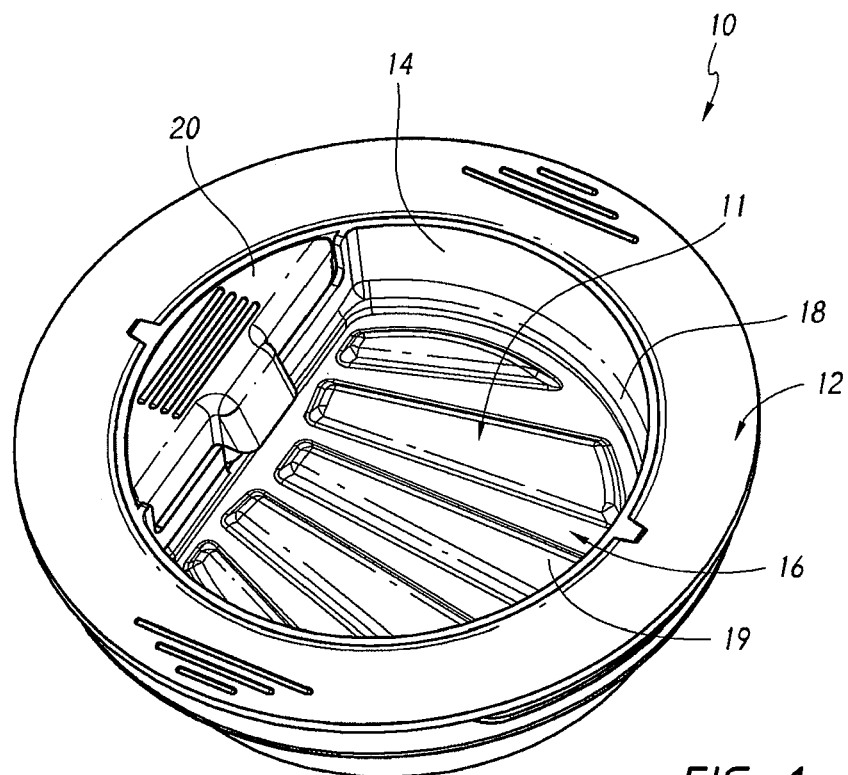
FIG. 1 illustrates a top perspective view of one embodiment of a drain valve.
Figure 2:
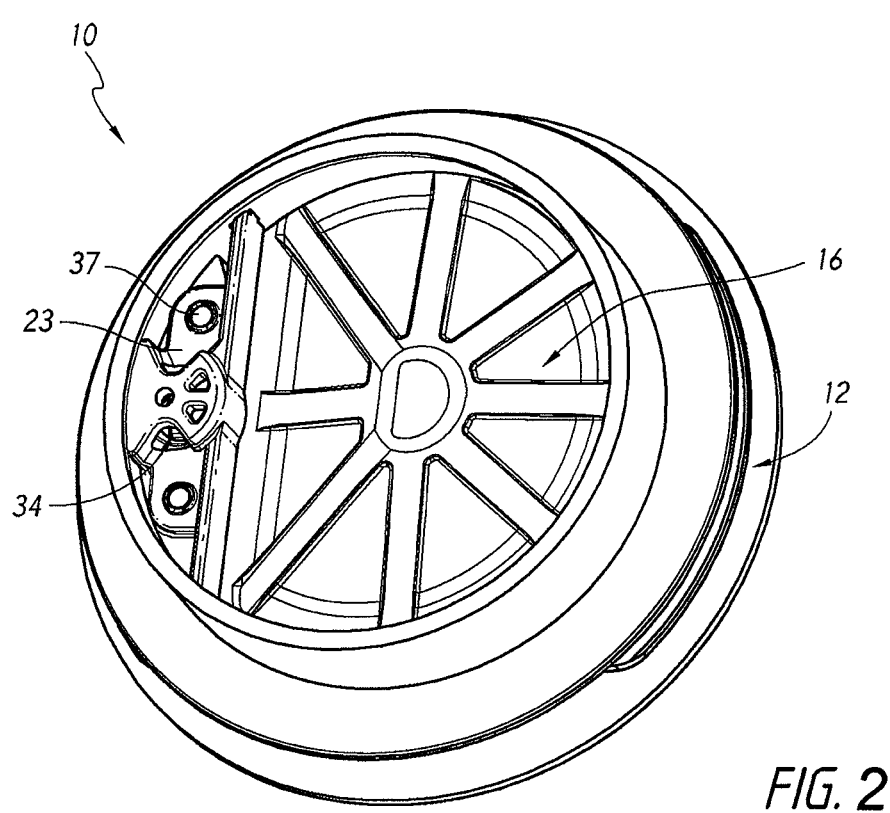
FIG. 2 illustrates a bottom perspective view of the drain valve of FIG. 1.

Referring to FIG. 1 and FIG. 2, a first embodiment of the floor drain valve 10 of the present disclosure is described. The floor drain valve 10 can include a gasket 12 configured to fit into a sealing relationship in a drain conduit and a housing 14 positioned within the gasket 12. In some embodiments, the housing can be generally cylindrical. In some embodiments, the housing can have an internal diameter that is wider at the top (e.g., at the inlet) than at the bottom (e.g., at the outlet). In some embodiments, the housing can have a generally constant internal diameter. In some embodiments, the internal diameter can have a non-circular shape (e.g., oval rectangular, square, etc.) that can also differ from the cross-sectional shape of the drain conduit in which the valve is placed. The housing can include a sealing seat, such as a flapper seat 18 (see also FIG. 3) that is connected to or formed as a part of housing 14 and a main flow channel 11. A one-way valve, such as a valve using a membrane or flapper 16, can be positioned within the housing and can be configured to engage and seal against the flapper seat 18 to prevent passage of fluids through the main flow channel 11. In some embodiments, described further below, a flapper 16 can include one or more ridges, ribs, or other structures 19 to increase the structural stability of the flapper. Although much of the description refers to flapper valves, it is understood that concepts described herein can be used with other types of valves, such as, for example, slit valves or duckbill valves.

With reference to FIG. 2, a flapper 16 can attach to a flapper mount (illustrated and described in more detail below) that can include one or more mounting projections 37 to help align the flapper 16. In some embodiments, a mounting clip 23 can be positioned to secure the flapper 16 in position. The flapper 16 is preferably biased upward into a closed position against a lower surface of the flapper seat 18. In some embodiments, the flapper 16 can include a resilient, elastomeric hinge (described and illustrated below) that can help bias the flapper 16 into the closed position. In the closed position, the flapper can resist or block backflow of fluid. Sufficient pressure above the flapper 16 can move the flapper 16 into an open position in which the flapper is separated or partially separated from the flapper seat 18, thereby allowing fluid to pass through the housing 14 and past the flapper 16. In some embodiments, the flapper in the open position may have only a portion of the flapper separated from the flapper seat. Preferably, the flapper can be opened to a position, such as when the flapper is opened to allow the maximum flow rate through the main flow channel 11, in which it is bent completely or mostly out of the way to create a substantially unimpeded path through the main flow channel 11. This can allow for greater maximum flows through the floor drain valve 10 and can also help allow debris or other detritus passing through the drain to pass through without catching and clogging.

In some embodiments, when the flapper 16 is opened to allow a maximum flow rate, the entire cross-sectional area of the main flow channel 11 is unimpeded. In some embodiments, when the flapper is opened to allow a maximum flow rate, no more than five percent of the cross-sectional area of the main flow channel is impeded. In some embodiments, when the flapper is opened to allow a maximum flow rate, no more than ten percent of the cross-sectional area of the main flow channel is impeded. In some embodiments, when the flapper is opened to allow a maximum flow rate, no more than thirty percent of the cross-sectional area of the main flow channel is impeded. In some embodiments, when the flapper is opened to allow a maximum flow rate, no more than fifty percent of the cross-sectional area of the main flow channel is impeded.

A pressure below the flapper will tend to push the flapper more firmly against the flapper seat 18, further sealing the flapper against the seat and further restricting or blocking passage of fluid past the flapper. Generally, unless noted to the contrary, discussions of pressures on one side or another of the valve 10, the flapper 16, or other component refers to a net pressure or force.

Preferably, a minimal downward pressure is required to open the flapper and permit a downward flow of fluid into the drain conduit 60. In some embodiments, 100 grams of fluid on the flapper can provide the minimum amount of force needed to move the flapper to an open position. In some embodiments, 25 grams, 50 grams, or 75 grams of fluid on the flapper can provide the minimum amount of force needed to move the flapper to an open position. In some embodiments, 2 ounces of water can be a sufficient amount of water on the flapper to move the flapper to an open position. In some embodiments, 4 ounces of water can be a sufficient amount of water on the flapper to move the flapper to an open position. In some embodiments, because it opens from a single side, a flapper valve can open more easily under water pressure than other valve types, such as umbrella valves. This is because as the flapper starts to swing open, the water accumulates on the opening area, creating a greater opening force.

Preferably, in addition to or independent of opening with a minimum pressure or force, various valves described herein can also open sufficiently to allow a minimum desired flow rate. For example, in some embodiments, valves described herein can open sufficiently to allow minimum flow rates according to required standards, such as the American Society of Sanitary Engineering (ASSE) Standard #1072-2007 approved Sep. 19, 2007. Thus, in some embodiments valves described herein can be configured to allow a flow rate of at least 6 gallons per minute on floor drains with a diameter of approximately 1.5 inches; a flow rate of at least 12 gallons per minute on floor drains with a diameter of approximately 2 inches; a flow rate of at least 34 gallons per minute on floor drains with a diameter of approximately 3 inches; a flow rate of at least 73 gallons per minute on floor drains with a diameter of approximately 4 inches; a flow rate of at least 132 gallons per minute on floor drains with a diameter of approximately 5 inches; a flow rate of at least 215 gallons per minute on floor drains with a diameter of approximately 6 inches.

In some embodiments, too much pressure below the flapper may not be desirable. Because greater pressure seals the flapper 16 more tightly against the flapper seat 18, it can require a greater pressure above the flapper to cause the flapper to open and allow fluid to drain. Thus, in some embodiments it may be desirable to allow for pressure that accumulates in a drainage or plumbing system and against a bottom side of the flapper to release. In some embodiments, a floor drain valve 10 can include a pressure relief conduit 34 extending from an area below the flapper 16 to an area above the flapper 16. The fluid relief conduit can allow for equalization of pressures on either side of the flapper 16, such that the amount of pressure above the flapper 16 required for it to open remains generally constant. This is described in more detail below.

Figure 3:
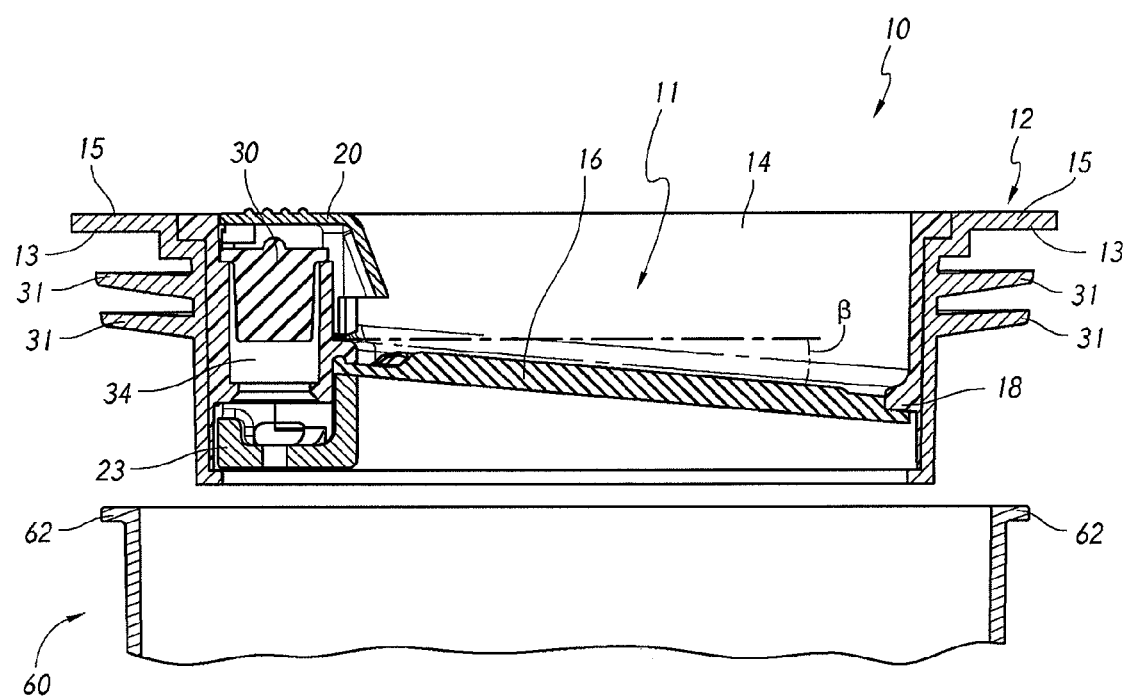
FIG. 3 illustrates a cross sectional view of one embodiment of a drain valve with a pressure relief conduit.

FIG. 3 illustrates one embodiment of a floor drain valve 10 that includes a pressure relief conduit 34. In some embodiments, as illustrated, the pressure relief conduit 34 can be included as part of the housing 14 and can be offset from the flapper 16 (or other valve element). For example, in the embodiment of FIG. 3, the pressure relief conduit 34 extends at least partially along a lateral side of the flapper 16 and/or to a side of the main flow channel 11. In some embodiments, the pressure relief conduit 34 can be included as part of the flapper 16 and/or pass directly through the flapper 16. Preferably, a valve is included within the pressure relief conduit 34. This can help ensure that odors or other gases below the flapper 16 do not regularly mix with gases above the flapper 16, and that fluids only flow through the pressure relief conduit 34 from below the flapper 16 to above the flapper 16 when there is a sufficient desired pressure differential.

In various embodiments, different types of valves and valve actuation systems can be used (e.g., flapper valves, check valves, ball valves, duck bill valves, etc.). In the illustrated embodiment of FIG. 3, the pressure relief conduit 34 can include a valve member 30. The valve member 30 may be biased into a closed position by gravity. When the valve member 30 is in a closed position, as shown in FIG. 3, it can restrict or block passage of fluid past the valve member 30. When a sufficient pressure accumulates below the valve member 30, the valve member 30 can be raised by the pressure, permitting an amount of gas to flow from the area below the flapper 16 to the area above the flapper 16 until the pressure drops sufficiently for the valve member 30 to fall back down and seal. The valve member 30 can be sized and configured to open at different pressures. In some embodiments, it can be configured to open at minimal pressure to help ensure that the region above the flapper 16 is generally in equilibrium with the region below the flapper. In some embodiments, the valve member 30 can be configured to open at a defined pressure differential greater than zero. Other types of valves that can be used include electronically actuated valves that open and/or close when a pressure sensor determines a defined pressure below the flapper 16 and/or other types of valves that may not require electronic actuation, such as, for example, ball valves, check valves, flapper valves, slit valves, duckbill valves etc.

As shown in FIG. 3, In some embodiments, a shield 20 can be positioned to cover the pressure relief conduit 34. In some embodiments, the shield 20 can be connected to the housing 14. The shield 20 can be used to prevent liquid that flows into the housing from flowing into the relief conduit 34 and/or onto the valve member 30. This can keep the relief conduit full of air, which can help ensure that the valve member 30 can open as necessary. It can also generally protect the valve member 30 and the conduit 34 from a downward flow of liquid and debris whenever the flapper 16 is opened by the presence of liquid above the flapper 16.

With further reference to FIG. 3, the drain valve 10 is illustrated in a position to be installed into a drain conduit 60. In this embodiment of use, the drain conduit 60 can be a vertical drain conduit, such as, for example, a floor drain or roof vent stack, which may include a trap (not shown). The drain conduit 60 may therefore be a variety of structures with which the drain valve 10 may couple. In some embodiments, the drain conduit 60 may be an end of a pipe or tube extending outwardly from a roof of a building. Further details of such conduits and coupling of the drain valve 10 to such conduits are discussed herein, for example with respect to FIGS. 13A-13B.

A gasket 12 around the housing 14 of the drain valve can be configured to help orient and/or seal the drain valve 10 with the drain conduit 60. For example, in some embodiments, the gasket 12 can include an upper flange 15 that has a lower surface 13 configured to engage an upper surface 62 of the drain conduit 62 to help seat the drain valve 10 in the drain conduit 62. In some embodiments, the gasket 12 can include one or more sealing projections 31. The diameter of the gasket 12 at one or more of the sealing projections can be configured to be wider than a diameter of the drain conduit 60, such that as the drain valve 10 is thrust downwardly into the drain conduit 60, the sealing projections 31 will deflect upwardly and apply a lateral pressure against the drain conduit 60 to help seat and/or seal the drain valve 10 in position. In some embodiments, the gasket 12 can have multiple sealing projections 31 of varying length to help ensure that the gasket 12 can fit and seal within various drain conduit 60 configurations encountered in the field. In some embodiments, the projections 31 can increase in length toward a top of the gasket 12. In some embodiments, in addition to or instead of the sealing projections 31, the gasket 12 can include an inflatable structure on an exterior of the gasket 12 that can be inflated to secure the gasket 12 in position. This is illustrated and described in FIG. 11, below.

In some embodiments, the gasket 12 and housing 14 can be installed separately. For example, in some instances, the drain conduit 60 into which the drain valve 10 is to be installed can include a permanently installed strainer mount (not shown) having an inside diameter that is too small for the gasket to fit through. In such instances, the drain valve 10 may be installed by separating the gasket 12 from the housing 14. The gasket 12 can be compressed into an oval shape or other narrowing shape, inserted through the strainer mount (once the strainer has been removed) and placed into its operative position within the drain conduit 60. The housing 14 can then be inserted through the strainer mount into engagement with the gasket 12 in its operative position within the drain conduit 60. The strainer can then be returned into position within the strainer mount. This method permits installation of drain valves 10 into drain systems for which the drain valve 10 otherwise would not have been able to be used. For instance, the strainer mount may be used with a roof vent stack or other roof structure in order to use the drain valve 10 on such structures.

Other installation methods and structures are considered. For example, in some embodiments, rather than or in addition to using the gasket 12, an outer housing or shell (not shown in FIG. 3) can be installed with the drain conduit 60, and the drain valve 10 can be inserted into the outer housing or shell. In some embodiments, the outer housing or shell can be glued or screwed into the drain valve. In some embodiments, the outer housing or shell can have internal threading and the housing 14 of the drain valve can have external threading configured to mate with the threading of the outer housing or shell. In some embodiments, the outer housing or shell can be sized and configured to sealingly retain the drain valve housing 14 without a threaded connection. Further details of structures, such as outer housings or shells or other structures, that may be used with the drain valve 10 to couple the valve 10 to the drain conduit 60, are discussed herein for example with respect to FIGS. 13A-13B.

In some embodiments, it can be desirable to provide a valve in the pressure relief conduit 34 that closes when a pressure differential between the area above the flapper 16 and below the flapper 16 exceeds a certain value. This can be useful, for example, where a sewer system is tied to a storm system. In such instances, during a storm event that floods the storm and sewer systems, high pressure fluids could bypass the flapper valve and flow up through the pressure relief conduit. A valve that closes when a pressure differential exceeds a certain value can also be useful in allowing for back pressure testing, such as of downstream drain conduits, without having fluids flow up through the pressure relief conduit 34 and without having to remove the valve and insert a plug. As another example, the drain valve 10 may be used on a roof vent to provide venting of gases from a building's plumbing system, as discussed in further detail herein.

Figure 4:
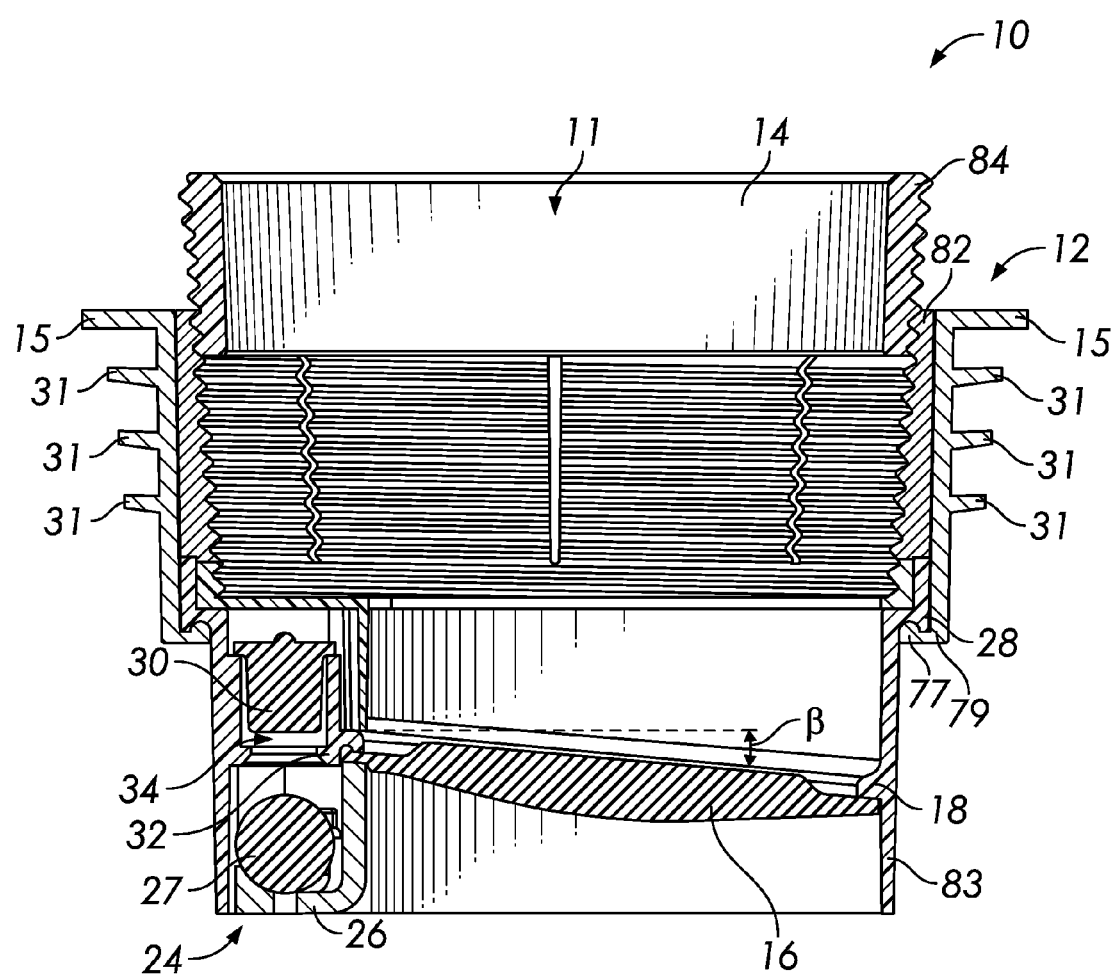
FIG. 4 illustrates a cross sectional view of one embodiment of a drain valve with a pressure relief conduit and a backflow valve.

In some embodiments, a ball valve 24 can be used to prevent high-pressure flows from passing upward through the pressure relief valve. In modifications, other types of one way valves can be used (e.g., flapper and duck bill type valves). FIG. 4 illustrates a cross sectional view of one embodiment of a floor drain valve 10 that includes the ball valve 24 in the pressure relief conduit 34. Many of the aspects of the embodiment of FIG. 4 can be the same as aspects of the drain valve 10 discussed with respect to FIG. 3, and where not described herein similar numbering can be considered to refer to similar features with similar functions. The ball valve 24 can include a ball valve seat 32 at an upper end of the ball valve 24 and a ball retainer 26 positioned at the bottom of the conduit, below the flapper 16. In some embodiments, the ball retainer 26 can be part of a mounting clip as described herein. The ball retainer 26 is designed to retain a ball 27. The ball valve 24 as illustrated is in an open position that allows fluid to flow past the ball 27. When the ball valve 24 experiences sufficient pressure beneath the valve 24, the pressure can drive the ball 27 upward into sealing engagement with the ball valve seat 32 and into a closed position, thereby restricting or blocking passage of fluids through the pressure relief conduit 34. In some embodiments, the ball 27 can be configured to float, such that it rises in water or other liquids. Thus, in some embodiments, when the ball valve 24 experiences a pressure beneath the valve 24 or a rise of liquid, the pressure or liquid can drive the ball 27 upward into sealing engagement with the ball valve seat 32, thereby blocking or substantially blocking passage of fluids through the pressure relief conduit 34.

In some embodiments, as illustrated, the ball valve 24 can be used with the valve member 30 to allow for equalization of pressure on opposite sides of the flapper 16 and/or to stop backflow during high pressure events. In some embodiments, a single valve can be used to allow for pressure equalization and to stop upward flow during high pressure events. For example, in some embodiments the ball valve 24 can be configured to close during high flow events, as described above, but can also be configured to seal against a lower ball valve seat located at a lower end of the ball valve 24 when no pressure differential exists, such that the ball valve 24 is only open in response to a range of pressure differentials between the area above the flapper 16 and the area below the flapper 16. In certain embodiments, the ball valve 24 can be positioned above the flapper valve 16. In certain embodiments, the ball valve 24 can be replaced with another form of check valve such as, for example, a flapper valve.

FIG. 4 also illustrates an embodiment of a floor drain valve 10 in which the valve 10 includes an expansion ring 84, such as a bushing as shown, that can be used to expand the housing into tightened engagement with a drain, roof vent, etc. In various embodiments, the expansion ring 84 may be a variety of bushing types such as the bushing as shown to be used with drain valves 10 of various designs. In some embodiments, the expansion ring 84 may be used with a floor drain valve that does not have the pressure relief conduit 34. In some embodiments, the expansion ring 84 may be used with a valve in locations beyond a floor drain, such as in vents in or on buildings as part of a heating, ventilation, air conditioning, and/or refrigeration system for the building. Various embodiments of expansion rings 84 are described in more detail below.

FIG. 4 also illustrates an embodiment of a floor drain valve 10 in which the housing 14 extends below the gasket 12. In some embodiments, the housing 14 can have a generally tapered outer profile to help prevent the valve 10 from becoming lodged within the drain 60. In some embodiments, the housing 14 can be elongated to provide room for a pressure relief conduit 34 with a ball valve or to provide an extended length pressure relief conduit.

In some embodiments, the gasket 12 and housing 14 can include features configured to help position and/or seal the gasket 12 in the housing 14 to prevent fluid from passing between the two. For example, in some embodiments, the housing 14 can have a cutout that receives a corresponding protrusion of the gasket 12. In some embodiments, such as illustrated in FIG. 4, the housing 14 can have a downward facing ledge 28 on its outer surface that can be configured to receive a section of the gasket 12, such as a lower flange or shelf 79, to help position the gasket 12 around the housing 14. This can help cause fluid pressure below the housing 14 to tighten a seal between the gasket 12 and the housing 14.

In some embodiments, the gasket 12 can include an O-ring 77, which can be a separate component from or integrally molded with the gasket 12. The O-ring 77 can help provide a seal between the gasket 12 and the housing 14. Additionally, insertion of the gasket 12 into a floor drain conduit, such as the floor drain conduit 60 shown in FIG. 3, can frequently place an upward force on the gasket 12, which can further improve the seal between the gasket 12 and the housing 14. In some embodiments, the O-ring 77 can be configured to at least partially fit within a corresponding channel in the downward facing ledge 28 of the housing 14. In some embodiments the O-ring 77 can be positioned between the gasket 12 and a side of the housing 14. In some embodiments, multiple O-rings 77 can be used.

In some embodiments, the housing 14 can have one or more ridges or other features on an outer surface thereof to help create zones of greater pressure between the gasket 12 and the housing 14. This can help provide or improve a seal between the gasket 12 and the housing 14.

Figure 5:
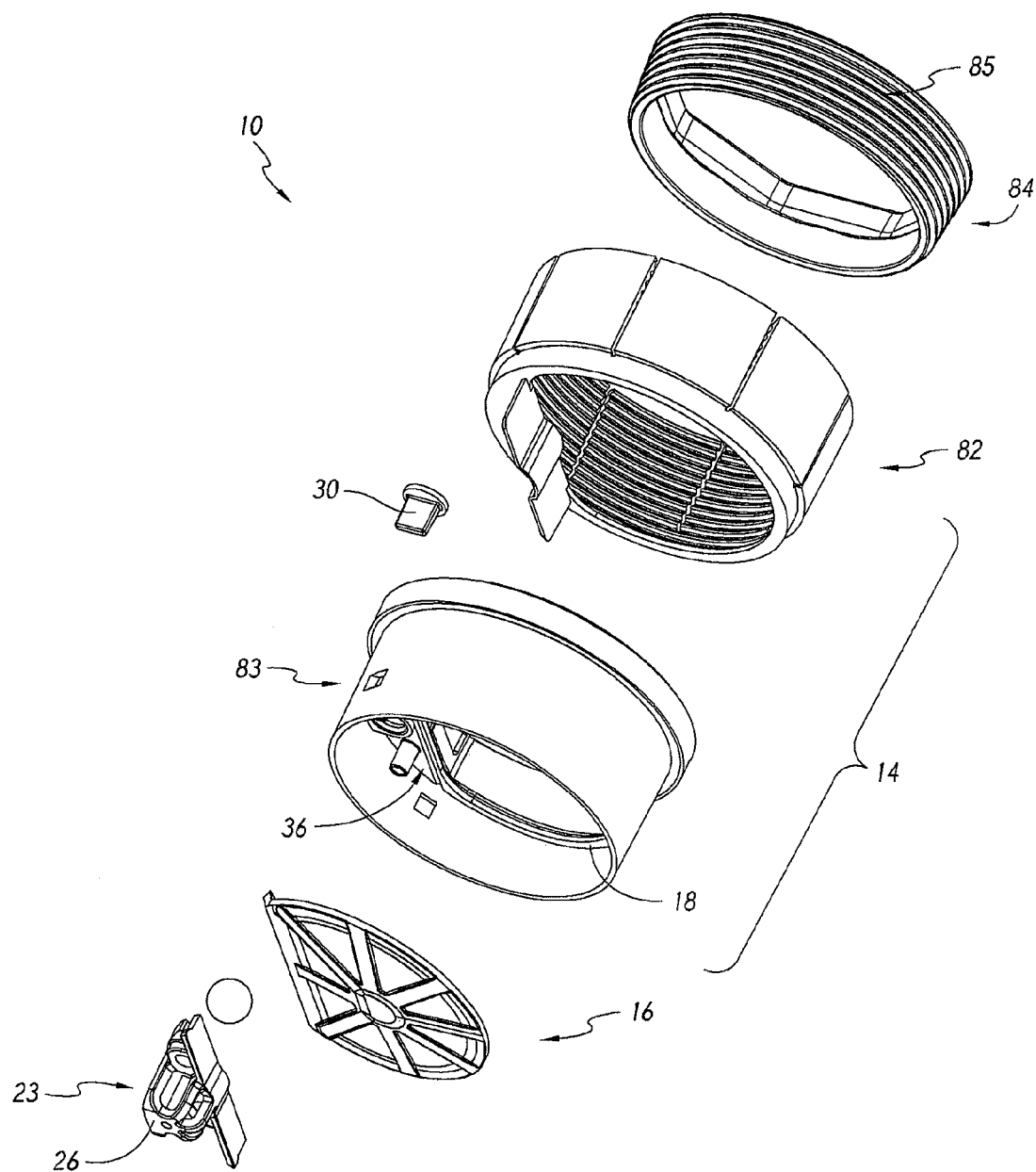
FIG. 5 is an exploded perspective view of the drain valve of FIG. 5.

FIG. 5 is an exploded view of the floor drain valve 10 of FIG. 4. FIG. 5 illustrates an embodiment of how many of the components of a valve can be aligned and assembled. For example, in some embodiments the housing 14 can include a separable upper portion 82 and a lower portion 83. The lower portion 83 can include a mount 36 configured to receive an attachment portion of a flapper 16 (described in more detail below). A support plate or clip 23 can be configured to attach to the mount 36 once the flapper 16 has been positioned on the mount 36 to thereby brace the flapper 16 into position. In some embodiments, the support plate or clip 23 can include a ball retainer 26 of a ball valve. In some embodiments, the upper portion 82 can be disconnected from the lower portion 83 and inserted into a drain above the lower portion 83 to block the lower portion 83 from being pushed out by water pressure below the lower portion 83.

Figure 6A:
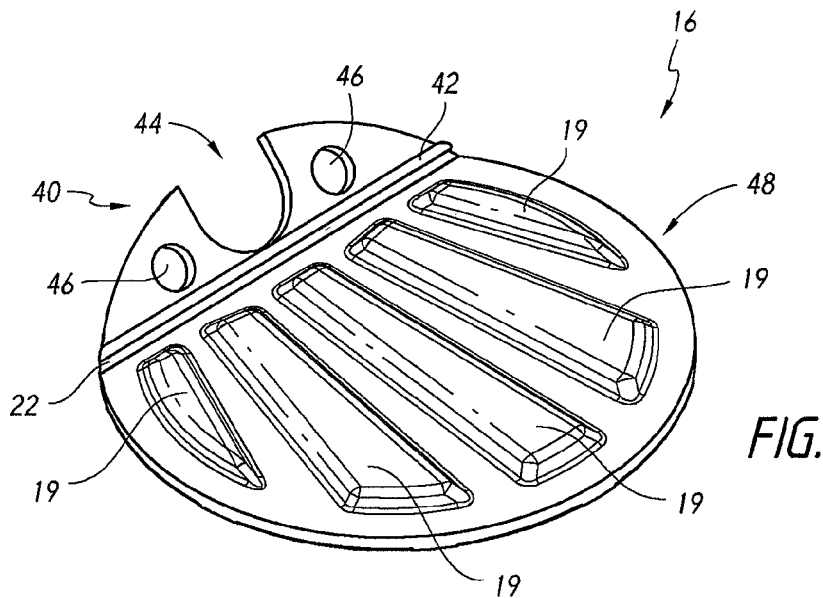
FIGS. 6A-6C are different views of one embodiment of a flapper.
Figure 6B:
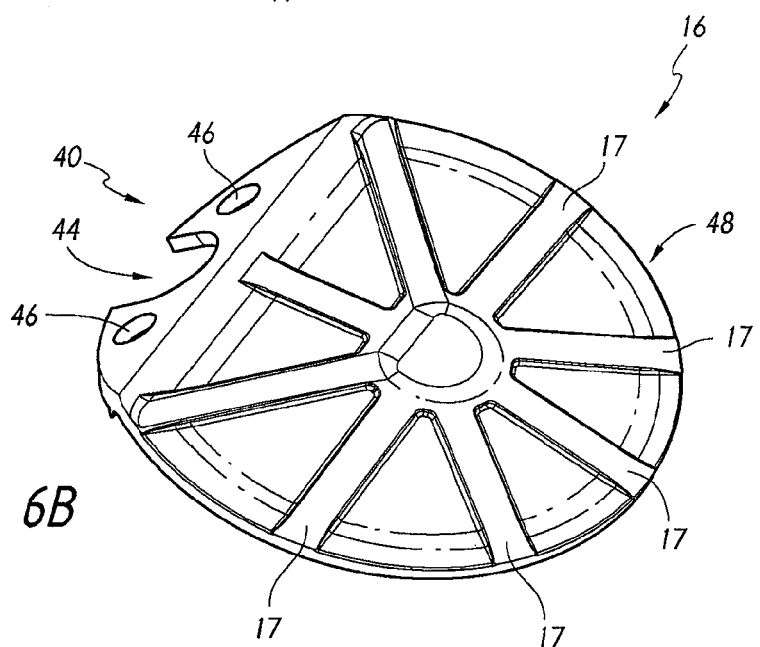
Figure 6C:
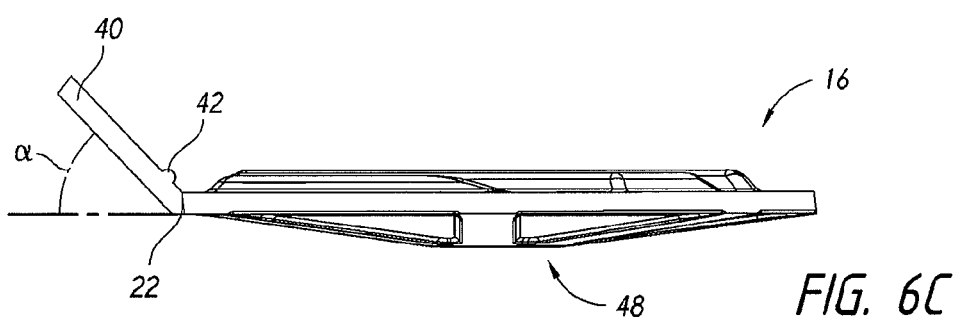

FIGS. 6A-6C illustrate one embodiment of the flapper 16. FIG. 6A illustrates a top perspective view of the flapper 16, FIG. 6B illustrates a bottom perspective view of the flapper 16, and FIG. 6C illustrates a side view of the flapper 16. As illustrated, in some embodiments the flapper 16 can include a sealing portion 48 and an attachment portion 40. The sealing portion 48 can engage and seal against a flapper seat 18, as described above. The attachment portion 40 can be used to position the flapper 16 in a floor drain valve 10, as described in more detail below. The sealing and attachment portions of the flapper 16 can be joined by a flapper hinge 22. Preferably, the flapper 16 is formed as a single, unitary component, although in some embodiments the sealing and attachment portions 48, 40 can be formed separately and joined by the hinge 22. In some embodiments where the flapper 16 is not monolithic, the sealing portion 48, the attachment portion 40, and/or the hinge 22 can be formed of different materials. In some embodiments, for example, the hinge 22 could be metallic and the sealing and attachment portions 48, 40 could be elastomeric.

In some embodiments, the sealing portion 48 of the flapper 16 can include one or more supports 19, which may be ridges, embossments, beams, or other suitable structural features, on an upper side of the flapper 16. The flapper 16 can also have one or more supports 17 on a bottom side of the flapper 16. The supports can provide additional structural integrity for the flapper 16 so that it can help retain its shape and retain a seal when the area below the flapper 16 is pressurized. In some embodiments, the flapper 16 can have a convex profile on its lower side, as visible in FIG. 6C, to help resist deformation from pressure beneath the flapper 16. Preferably, the flapper 16 has an equilibrium position, as illustrated, in which the sealing portion 48 and attachment portion 40 are at an angle α relative to each other. This can help bias the flapper 16 toward a closed position, as described in more detail below. In some embodiments, the angle α can vary between approximately 10 degrees and approximately 70 degrees. In some embodiments it can vary between approximately 20 degrees and approximately 60 degrees. In some embodiments it can vary between approximately 30 degree and 55 degrees. In some embodiments it can be approximately 45 degrees.

In some embodiments, when the flapper 16 is positioned in a valve, such as illustrated in FIG. 3 and FIG. 4, it can be configured and arranged to pivot around the hinge 22 into an open position to allow liquid to flow freely from the inlet and through the outlet of the housing 14. The hinge 22 may be a resilient hinge. The flapper can be disposed at an angle β (shown in FIGS. 3-4) within the housing 14, such that the attachment portion 40 of the flapper 16 is positioned closer to the inlet, and the sealing portion 48 of the flapper is positioned closer to the outlet. As depicted in FIG. 4, for example, the sealing portion 48 of the flapper 16 is positioned below the attachment portion 40 of the flapper. In some embodiments, the angle β can vary between approximately 10 degrees and approximately 60 degrees. In some embodiments it can vary between approximately 20 degrees and approximately 50 degrees. In some embodiments it can vary between approximately 25 degree and 35 degrees. In some embodiments it can be approximately 30 degrees.

The attachment portion 40 of the flapper 16 can be secured to or formed with a resilient flapper hinge 22. The resilient hinge 22 biases the flapper upwardly into sealing relationship with the flapper seat 18. The downwardly angled arrangement of the flapper 16 within the housing 14 enables the flapper 16 to be easily opened (lowering the sealing end of the flapper 16 from its normally closed position) due to water flow from the inlet to the outlet. The downwardly angled arrangement also prevents opening of the flapper 16 due to gas flow from the outlet to the inlet.

The flapper 16 can be made from a variety of materials, and is preferably made from an elastomeric material. In some embodiments the flapper 16 is sufficiently rigid to resist back pressure but is flexible. In some embodiments, the flapper 16 can be constructed from a relatively rigid material, such as various types of polymer materials, EPDM rubber, neoprene, silicone, etc. In some embodiments, the flapper 16 can be formed from a material having a durometer between about 30 to 90. In some embodiments, the flapper 16 can be formed from a material having a durometer between about 40 to 60. Preferably, the flapper 16 is formed of a material that is sufficiently rigid to resist back pressures on the flapper 16, but sufficiently flexible and resilient to allow the hinge 22 to rotate the flapper 16 to and from the open and closed positions. The flapper 16 may further by formed from a combination of these and other suitable materials, whether the flapper 16 is a single, monolithic piece or is composed of multiple parts assembled together.

The attachment portion 40 of the flapper 16 can have a variety of features to help ensure alignment of the flapper 16 within the valve 10 when installing the flapper 16 and when the valve 10 is in use. For example, in some embodiments the flapper 16 can have one or more apertures 46 that can receive a post or projection to help position the flapper 16. In some embodiments, the apertures 46 can be slots. The flapper 16 can also include an indexing ridge 42, which can be positioned in a corresponding channel to help positively place and maintain the flapper 16 in position. In some embodiments, the flapper 16 can include a cutout 44, which can be used to fit the attachment portion 40 around components of a valve as necessary. For example, in some embodiments the cutout 44 can be positioned around a pressure relief conduit 34. In some embodiments, the pressure relieve conduit 34 also extends between the apertures 46. These various features and their relationship to other parts of a valve are described in more detail below.

Figure 7A:
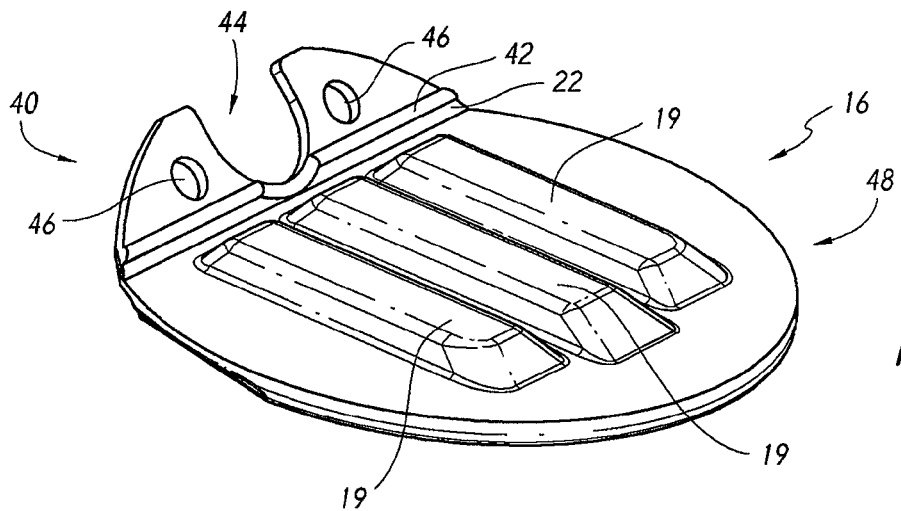
FIGS. 7A-7C are different views of one embodiment of a flapper.
Figure 7B:
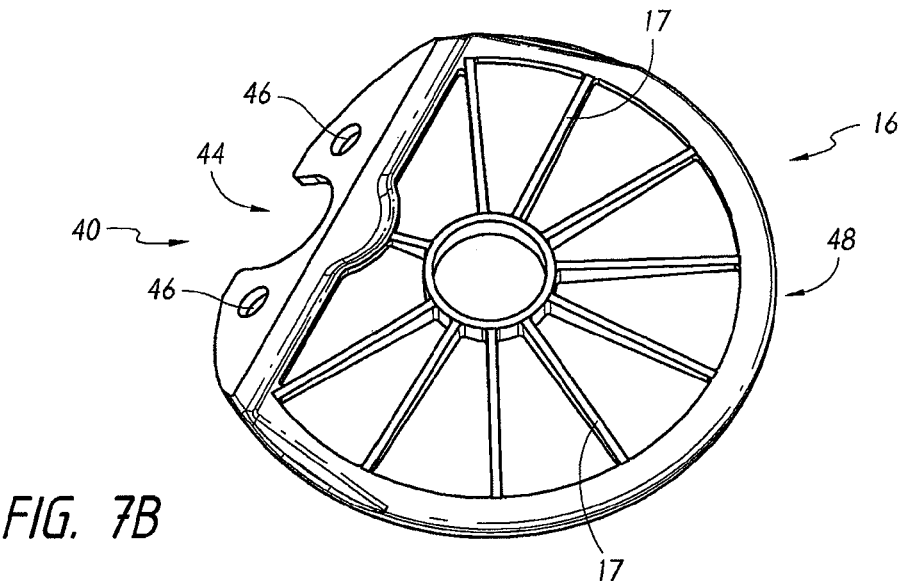
Figure 7C:
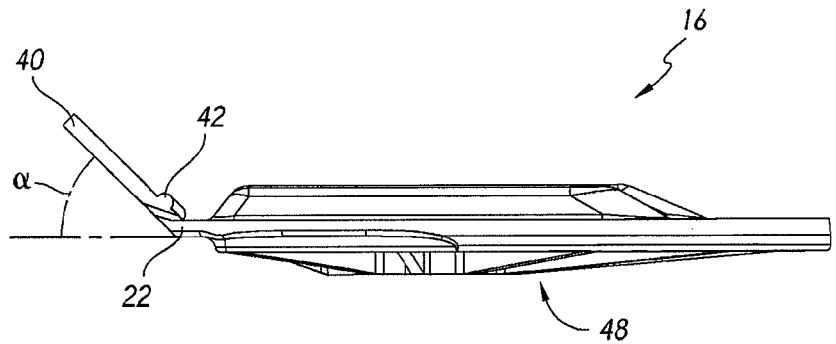

FIGS. 7A-7C illustrate another embodiment of the flapper 16. FIG. 7A illustrates a top perspective view of the flapper 16, FIG. 7B illustrates a bottom perspective view of the flapper 16, and FIG. 7C illustrates a side view of the flapper 16. Many of the aspects can be the same as aspects of the flapper 16 discussed with respect to FIGS. 6A-6C, and where not described herein similar numbering can be considered to refer to similar features with similar functions. In some embodiments, the flapper 16 can have varying numbers of supports 19. As illustrated in FIG. 7A, in some embodiments the flapper 16 can have three supports 19. FIG. 7A also illustrates an embodiment of the flapper 16 in which the cutout 44 extends at least partially through the indexing ridge 42.

Although the flappers 16 are illustrated as generally round, they can have a variety of shapes. In some embodiments, for example, the flappers 16 can be rectangular, circular, hexagonal, octagonal, or of other shapes. In some embodiments, the sealing portion 48, the attachment portion 40, and/or the hinge 22 can have multiple components. In some embodiments, for example, the flapper 16 can include two substantially semicircular relatively rigid flapper elements positioned side-by-side and attached with a resilient hinge each at an upper end thereof to a diametrically positioned mounting structure. Each of the flapper elements can have a peripheral edge resiliently urged upwardly into sealing contact with a flapper seat 18 or a portion of a flapper seat. In some embodiments, the flapper 16 can be a bi-valve, a duckbill valve, umbrella valve, or other type of one-way valve. In some embodiments, the flapper 16 can be formed of overlapping wedges.

Figure 8:
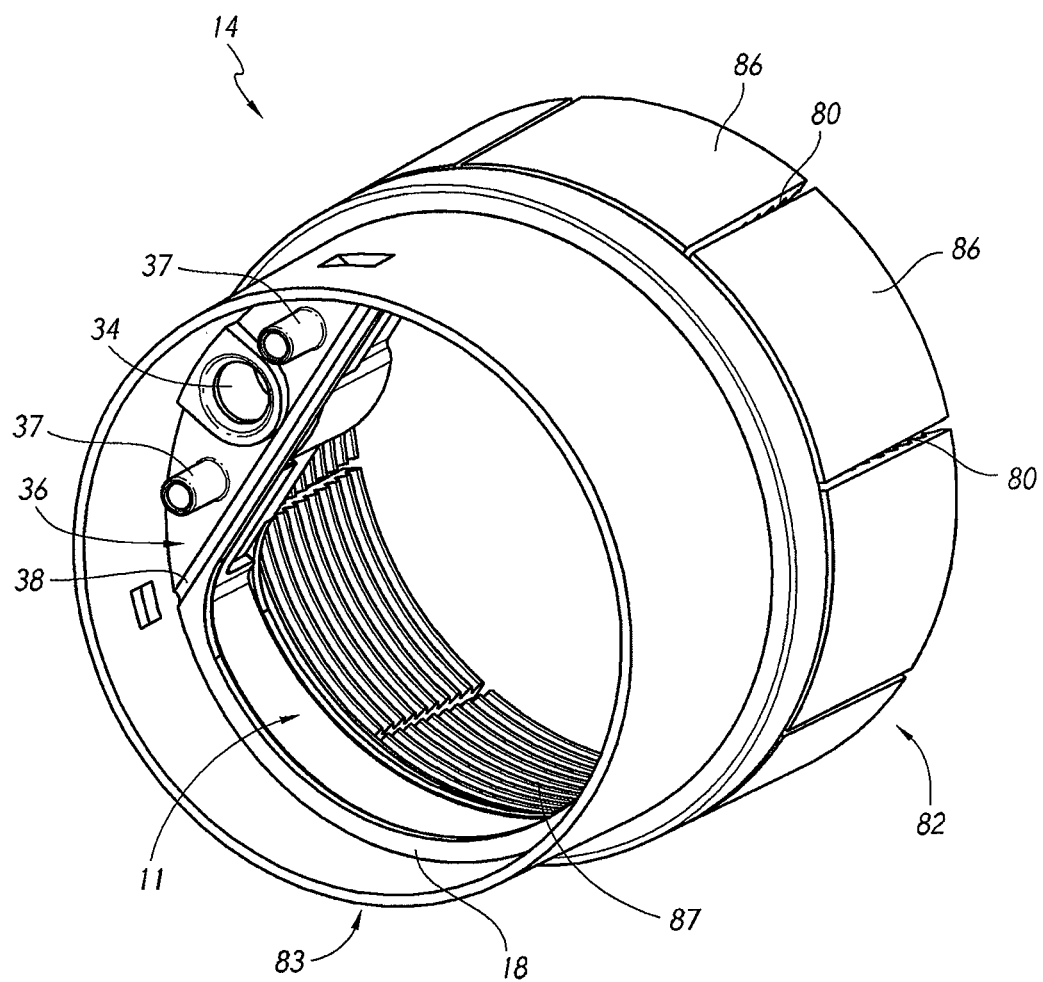
FIG. 8 is a bottom perspective view of a housing used with a drain valve.

FIG. 8 illustrates a bottom perspective view of the housing 14 of the valve 10. The housing 14 can include the flapper mount 36 configured to receive the attachment portion 40 of the flapper 16. In some embodiments, the flapper mount 36 can include one more projections 37 configured to pass through corresponding apertures or slots on the flapper 16 to help retain the flapper 16 in position. In some embodiments, the flapper mount 36 can include an indexing channel 38 configured to receive a corresponding indexing ridge of the flapper 16. The indexing channel and indexing ridge can help properly align the flapper and also distribute forces exerted by back pressure upon the flapper 16 to thereby help maintain the flapper 16 in its position when sealed against a valve seat, such as the valve seat 32 shown in FIG. 4. In some embodiments, the housing 14 can include at least a portion of the pressure relief conduit 34, and the flapper 16 can include a cutout, such as the cutout 44 described above, configured to fit around the conduit 34. Accordingly, in the illustrated embodiment, the pressure relief conduit 34 can extend, at least partially, through the attachment portion 40 of the flapper valve 16 and/or on one side on the indexing ridge 42.

FIG. 8 also illustrates a flapper seat 18, against which the flapper 16 can seal when the flapper 16 is in a closed position. Preferably, the flapper mount 36 is parallel with the plane of the flapper seat 18. In some embodiments, the flapper mount 36 can be at an angle relative to the plane of the flapper seat 18, but the angle is preferably less than the angle between the attachment portion 40 and sealing portion 48 of the flapper 16 configured for use with the housing 14. Thus, when the attachment portion is positioned on the flapper mount 36 and held into place by a support plate or clip 23 (illustrated in FIG. 1B), and the flapper 16 tends toward its equilibrium position, the sealing portion 48 of the flapper 16 can press against the flapper seat 18 to create a seal. In some embodiments, the flapper 16 can be configured such that the seal is of varying strength, depending on the desired properties of the drain valve 10. In other words, in various embodiments the flapper 16 can be configured to be biased toward its equilibrium position with varying degrees of force when against the flapper seat 18. In some embodiments, the flapper 16 can be configured such that the sealing portion 48 of the flapper 16 is aligned with the flapper seat 18 when the flapper 16 is in an equilibrium position (such that the flapper 16 experiences no biasing force when it is against the flapper seat 18), and no seal is created between the flapper 16 and the flapper seat 18 until the flapper experiences a pressure on its bottom side.

The seal between the flapper 16 and the flapper seat 18 can help prevent the flow of noxious gases below the flapper from flowing past the flapper 16. The seal can also help prevent fluid from flowing upward, such as during a storm event or during back pressure testing. If the flapper 16 is expected to withstand particularly high pressure events, it can be made thicker or with additional supports 17, 19 to help make sure that the flapper 16 does not buckle or otherwise fail against the pressure. When liquid flows upon the upper surface of the flapper 16, however, the pressure of the liquid can cause the flapper 16 to angle away from the flapper seat 18 to thereby open the valve 10, permitting passage of the liquid. Once the liquid flows past, the resilient hinge 22 can return the flapper toward its equilibrium position, which can include resealing the flapper 16 against the flapper seat 18.

In some embodiments, the housing 14 can have various features configured to allow the housing 14 to expand outward to seal the housing 14 against a gasket surrounding the housing 14, to help seal the gasket against a drain conduit such as the drain conduit 60, and/or to help seal the housing 14 against a drain conduit such as the drain conduit 60. Outward expansion of the housing 14 can also help the housing 14 and/or gasket engage the drain conduit so that the drain valve 10 is not forced upwardly from pressure below it, such as in embodiments in which a drain valve is designed to withstand back pressures (e.g., during back pressure testing). In some embodiments, for example, an upper section 82 of the housing 14 can include a plurality of expandable sections 86 separated by slots 80. An insert can be inserted into the upper section which can expand the expandable sections 86 outward, which can in turn press against a gasket surrounding the housing. In some embodiments, the upper section 82 can have internal threading 87, and an insert can be a bushing. In some embodiments, the housing 14 can be a single piece or component, and in some embodiments the housing can be formed of multiple, connected pieces.

Figure 9A:
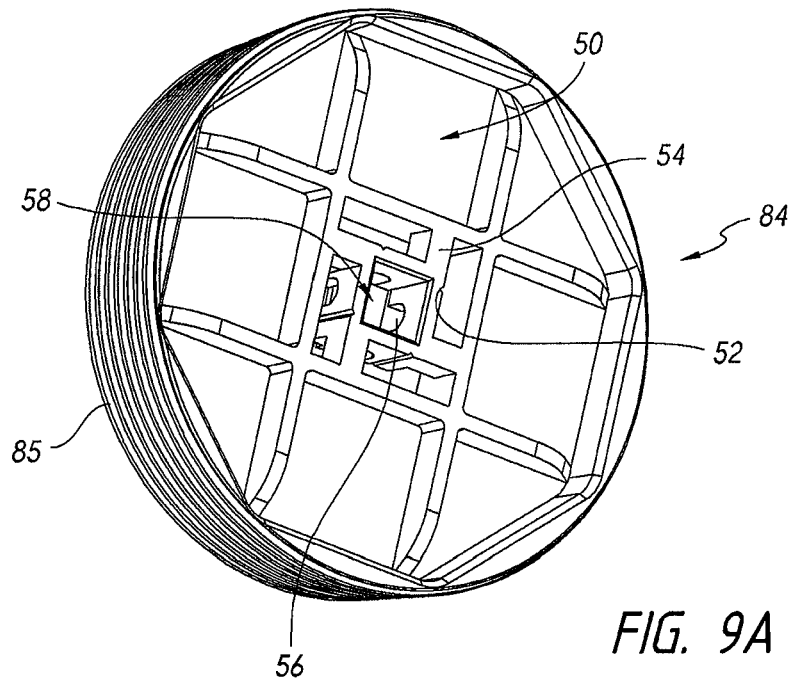
FIG. 9A is a top perspective view of a bushing with an insertion tool.
Figure 9B:
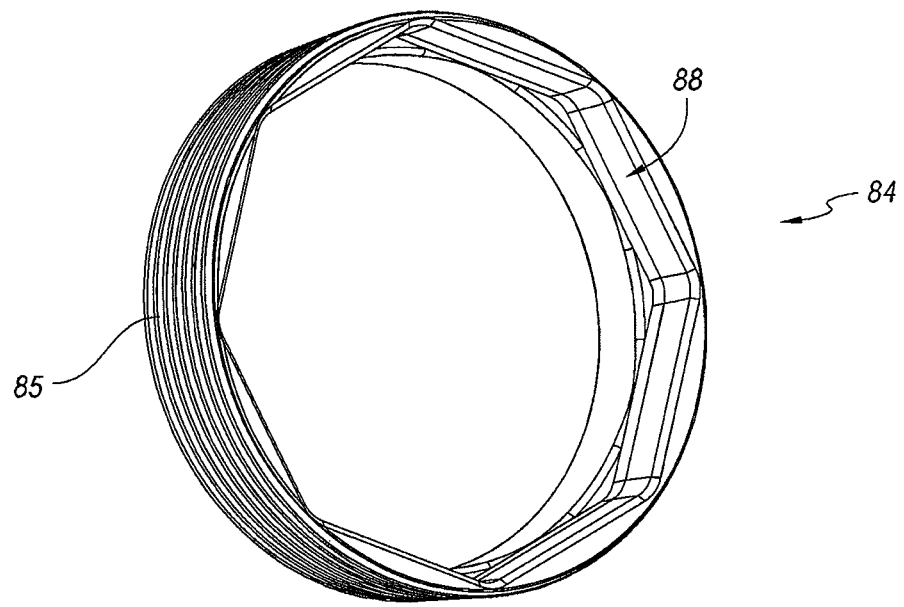
FIG. 9B is a top perspective view of the bushing of FIG. 10A without the insertion tool.

FIGS. 9A-9B illustrate one embodiment of an expansion ring 84, such as a bushing, that can be inserted within an upper section 82 of the housing 14 and expand the housing. As discussed above, in various embodiments a bushing such as the expansion ring 84 can be used to expand a housing in valves of various designs, including valves with or without fluid relief conduits and/or valves for use with floor drains, roof vents, or for other applications. The expansion ring 84 can have external threading 85 that can be configured to couple with the internal threading 87 of the housing. In some embodiments, the threading of the expansion ring 84 and/or the internal threading 87 of the housing can be tapered so that upon threading the expansion ring 84 farther into the upper portion 82 of the housing, the segments 86 are forced farther outward to further tighten the drain valve 10 into position within a drain conduit 60. In some embodiments, an outer diameter of at least a section of the expansion ring 84 can increase from a bottom of the section to a top of the section. In some embodiments, an inner diameter of at least a portion of the housing can decrease from a bottom of the portion to a top of the portion. These differences can help cause the segments 86 to expand outward as the expansion ring 84 is moved into the housing.

In some embodiments, the expansion ring 84 can include a section 88 with a non-circular internal profile. This section can be used to receive a tool, such as the tool 50 shown in FIG. 9A, to help tighten or loosen the expansion ring 84 within the housing 14. In some embodiments, the tool 50 can be a single use tool that is sold attached to the expansion ring 84. The tool can be frangible and can be configured to break at a desired level of torque. Thus, the tool can be rotated to tighten the expansion ring 84 into the housing until the desired level of torque is reached, at which point the tool can break. In some embodiments, the tool 50 can be tightened with a driver, such as a ½ inch square driver, that can be inserted into an opening 58 of the tool 50, which in some embodiments can be at the center of the tool. In some embodiments, other connections are possible between the tool 50 and a driver.

Figure 9C:
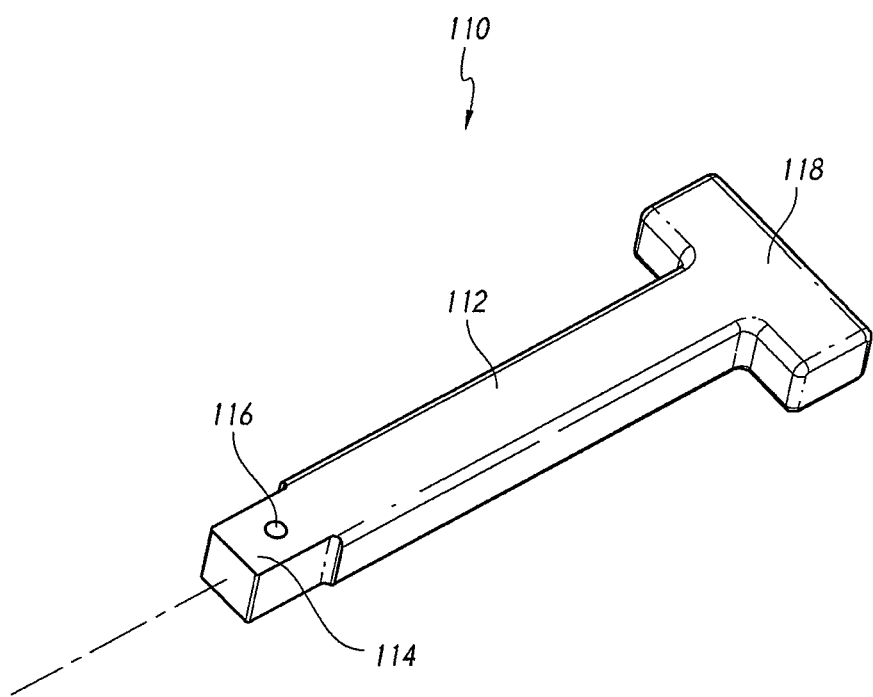
FIG. 9C is a perspective view of one embodiment of a driver.

FIG. 9C illustrates one embodiment of a driver 110. The driver 110 preferably includes an insertion portion 114 sized to fit within the opening 58 of the tool 50 (see FIG. 9A). The insertion portion 114 can have a variety of cross-sectional profiles, which preferably match a cross-sectional profile of the opening 58 of the tool 50. For example, in some embodiments, the cross-sectional profile of the insertion portion can be square, hexagonal, octagonal, or of other shapes. Preferably, the cross-sectional profile of the insertion portion is symmetrical to facilitate insertion into the tool 50, but in some embodiments it may be desirable for the insertion portion 114 to have a cross-sectional profile that is not symmetrical and/or that allows the driver 110 to be inserted into the tool 50 in only a single orientation.

In some embodiments, the driver 110 can include a main body 112 that is sized and/or shaped differently from the insertion portion 114. Where the main body 112 is larger, it can provide additional strength to the driver 110 and help prevent the driver 110 from being inserted too far into or through the tool 50. In some embodiments, the driver 110 can include one or more protrusions or detents 116 that can fit within a recess 56 within the opening 58 (shown in FIG. 9A). This can help properly align the driver 110 and retain it in position. In some embodiments, the detent 116 can be spring biased outward and can be retracted inward for easier insertion of the driver 110. In some embodiments, the driver 110 can also include a handle 118 for easier gripping and/or turning of the driver 110.

In some embodiments, the size and/or shape of the insertion portion 114 and/or the detent 116 can help create a pressure fit between the insertion portion 114 and the opening 58 of the tool 50, such that the tool 50 will not slide or otherwise move off of the driver 110 without application of a force. In some embodiments, the combined weight of a bushing 84 and tool will not remove the tool from the driver. This can make it easier to insert an expansion ring 84 such as a bushing during installation of a floor drain valve. For example, when the tool is attached to a bushing, in some embodiments an installer can hold the tool 50 and lower the bushing or other expansion ring 84 into position within a housing 14 without having to insert his or her hand into the drain. In certain embodiments, other mechanisms can be used to couple the driver 110 to the tool 50 and/or other tools and mechanisms can be used. Other mechanisms e.g., cams, springs, etc. can be used to expand the bushing or other expansion ring 84 in modified embodiments.

With further reference to FIG. 9A, the tool 50 can include frangible portions 52 that can include a notch, cut, or other weakening to allow the material of the tool 50 to break. In various embodiments, the tool 50 can be formed of a rigid material, such as plastic, ceramic, or other material. Preferably, the frangible portions 52 are positioned to receive a force from the driver 110 as the tool 50 is used to tighten the bushing or other expansion ring 84 within a housing. When sufficient torque is applied, the frangible portions will break and prevent or limit the driver from tightening the tool 50 further. In some embodiments, the frangible portions can be designed to break at a desired level of torque.

In addition to the frangible portions 52, in some embodiments the tool 50 can also include loosening portions 54 (see FIG. 9A) that can be aligned with an edge or surface of the driver 110 that is used to loosen the tool 50. The loosening portions 54 preferably remain in place even once the frangible portions 52 have broken, thereby allowing the driver 110 to still be used to loosen and remove the expansion ring 84 from the housing 14. In some embodiments, the tool 50 can include the frangible portion 52 and the loosening portion 54 that align with each face of the driver 110.

In some embodiments, the expansion ring 84 and an expandable housing can be separate from the floor drain valve 10 or other valve. The expansion ring 84 and expandable housing, such as the housing 14, can be positioned within a drain above the valve 10 and can still help prevent the valve 10 from backing out of the drain when it is subject to back pressure. Other types of locking devices and systems can be used with and/or as part of the floor drain valve 10.

Figure 10A:
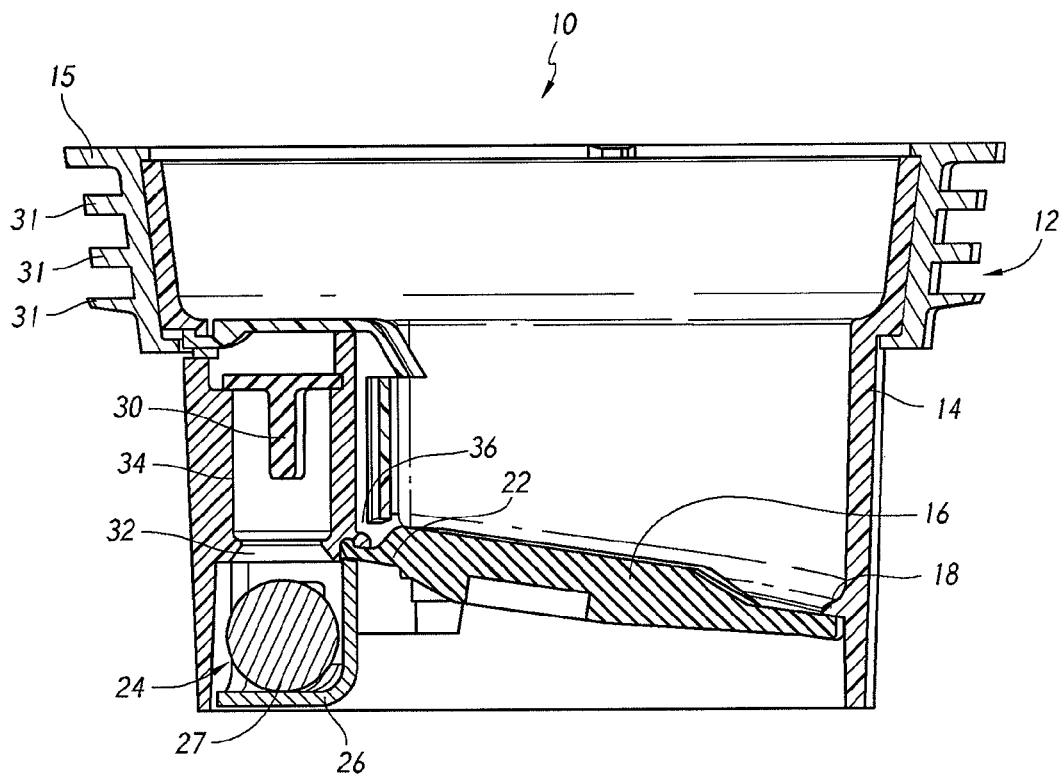
FIG. 10A illustrates a cross sectional view of one embodiment of a drain valve with a pressure relief conduit and a backflow valve.

FIG. 10A illustrates a cross sectional view of one embodiment of the drain valve 10 showing the presence of a ball valve 24 in a pressure relief conduit 34. The ball valve 24 can have a ball valve seat 32 and a ball retainer 26 positioned at the bottom of the conduit, below the flapper 16. The ball retainer 26 is designed to retain a ball 27. The ball valve 24 is configured to resist backward pressure and flow of fluids to test the downstream area for leakage. The ball valve 24 is closed by the presence of backward flow of water or sufficient amount of air for testing and permits back pressure testing of the downstream drain conduits.

The flapper 16 may be constructed of a relatively rigid material such as various types of plastics well known in the art and may be mounted with the elastomeric hinge 22. The ball valve 24 which is normally in an open position rises to engage with the ball valve seat 32 and closes the pressure relief conduit 34 when fluid flows upward thereby sealing the floor drain valve 10 to prevent the flow of fluid in a reverse direction. When the fluids push upwardly against the flapper 16, it presses against the flapper seat 18 and forms a tight seal to prevent the fluid from moving upwardly past the flapper 16. Thus, whenever water flows upon the upper surface of the flapper 16, the flapper 16 opens permitting passage of the water, and then reseals resiliently against the flapper seat 18 to prevent gases from the downstream drain conduits from passing upwardly past the flapper 16, permitting pressure testing of the downstream drain conduits. Thus, this embodiment permits the flow drain valve to provide dual functions such as preventing backflow of gases and pressure testing the downstream drain conduits.

The outer housing 12 together with the gasket 12 provides multiple positioning rings and sealing rings that are contemplated to fit in the various drain conduit configurations encountered in the field.

Figure 10B:
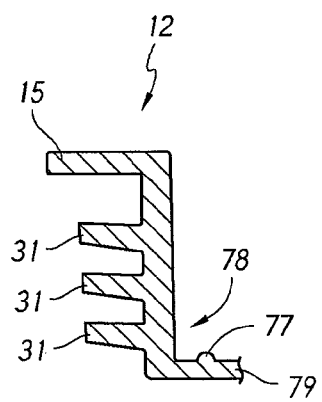
FIG. 10B illustrates a cross section of a portion of a gasket.

In FIG. 10B there is shown a partial cross section of the gasket structure utilized in the drain valve body within a drain conduit. A shelf 15 can be used to locate the gasket 12 upon a horizontal surface (not shown) of a drain conduit. At the lower zone 78 of the gasket 12 a shelf 79 is provided, to receive a corresponding surface of the body of the valve 10, such as the lower portion 83 (shown in FIG. 4), and to provide additional sealing mechanisms, such as by an integrally molded "O" ring 77. When coupled with a drain conduit, an upwardly directed pressure causes the shelf 79 to seal against the horizontal surface of the drain conduit.

Figure 11:
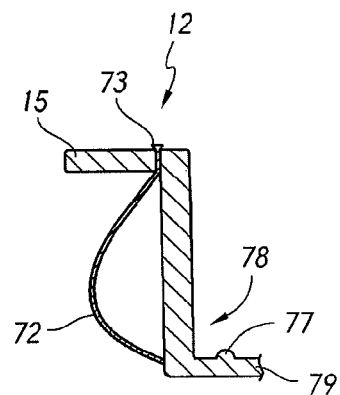
FIG. 11 illustrates a cross section of a portion of a gasket.

FIG. 11 shows a partial cross section of one embodiment of the gasket 12 structure that includes an inflatable membrane 72 that can be used to secure the gasket 12 (and drain valve 10) into position within a drain. In some embodiments, an inflation valve 73 of the inflatable membrane 72 can be accessible from the flange or shelf 15 of the gasket 12. The gasket 12 can be inserted into the drain valve 10 with the membrane 72 deflated, and the membrane 72 can then be inflated to secure the gasket 12 in position. To remove the gasket 12, the membrane 72 can be deflated. In some embodiments, the gasket 12 can include sealing projections in addition to the inflatable membrane 72. In some embodiments, the inflatable membrane 72 can be included on a separate sealing structure positioned above the drain valve 10 and gasket 12 in order to help lock the drain valve 10 within the drain.

Other locking devices and systems may be used, either as part of the gasket 12 on the drain valve 10, connected to other parts of the drain valve 10, or as part of a device separate from the drain valve 10 to lock in the drain valve from above the drain and prevent the drain valve from backing out. For example, in some embodiments a snap lock, such as bale-and-gasket snap locks similar to those found on mason jars, can be used. Other examples include multi-layered locks comprising two relatively rigid layers with an elastomeric layer between them. Screws or other tightening or expanded mechanisms can join the rigid layers, and as the screws or other mechanisms are tightened to bring the rigid layers closer toward each other, the elastomeric layer will deform outward and seal against the drain.

Roof Vent Applications

As described above, the valves embodiments described herein can also be used in building vents, such as roof vents for plumbing systems. For water to drain freely out of a house waste system, there must be adequate venting. The venting performs various functions. For instance, venting allows air in front of the water rushing through the waste pipe to be pushed out of the way. Venting also allows air to be reintroduced to the waste piping after the water has gone by. Venting further allows sewer gases to escape outside through a vent stack (also sometimes referred to as "roof vent" or "vent pipe") which extends out through the roof. The vent stack normally should extend at least six inches up through the roof of the house. In some cases, the vent terminates in the attic which may allow odors to find their way into the house.

The one-way valve can include a vent guard (described below) that can be attached to the top of the valve. In one embodiment, the vented drains include a one-way flapper (such as describe above and further described below) to allow air to flow down in the drain. The flapper can only open in one direction, thus preventing odors and gases under normal conditions from flowing up out of the drain (e.g., into the attic or above the roof). In some embodiments, additionally, if the pressure in the vent system exceeds a predetermined amount, the drain is vented with a pressure relief valve that allows gases to escape once a sufficient pressure is reached such as in the embodiments described above.

In some embodiments, the roof vent valve can be inserted into, onto or otherwise coupled with the top or other portions of the vent stack or roof vent. Accordingly, the valve for the roof vent can include a flow conduit connected to the vent pipe. These include any of the embodiments of the drain valve 10 described above. They further include any of the embodiments of a drain valve 100 described with respect to FIGS. 12A-14C. In embodiments for roof vents, in can be advantageous for the roof vent valve to open at different minimum pressures than, for example, a valve configured for a floor drain. For example, the minimum pressure on the first side of the valve (e.g., flapper) for moving the valve to an open position can be 4 ounces of water in one arrangement. In certain arrangements, the valve exceeds, meets and/or complies with the standards set forth in ASSE #1050-2009 for Stack Air Admittance Valves, ASSE Board Approved May 2009, ANSI Approved January, 2010 for Sanitary Drainage Systems, the entirety of which is hereby incorporated by reference herein.

For example, in some embodiments, valves described herein can open sufficiently to allow minimum flow rates according to required standards, such as the American Society of Sanitary Engineering (ASSE) #1050-2009 referenced above. Thus, in some embodiments valves described herein can be configured to allow a airflow rate of at least 4.0 Cubic Feet Per Minute (CFM) for Drainage Stack Pipe Size with a diameter of approximately 1.5 inches; a flow rate of at least 8 CFM on pipes with a diameter of approximately 2 inches; a flow rate of at least 12 CFM on drains with a diameter of approximately 2.5 inches; a flow rate of at least 23 CFM on floor drains with a diameter of approximately 3.0 inches; a flow rate of at least 47 CFM on floor drains with a diameter of approximately 4.0. The Durometer of the roof vent valve can be within, lower or higher than the ranges described above.

Figure 12A:
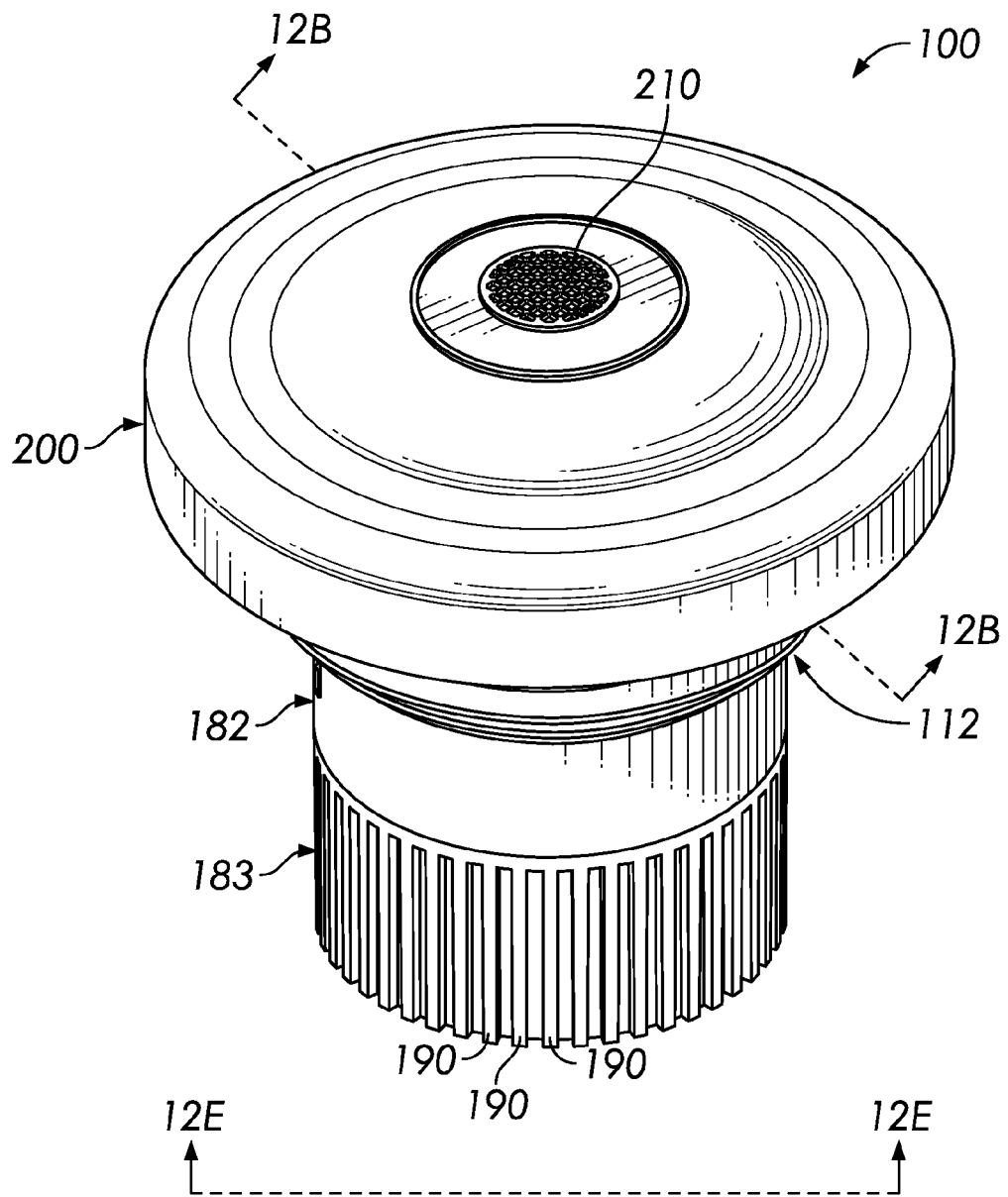
FIG. 12A is a perspective view of an embodiment of a roof vent valve that includes a guard.

FIG. 12A is a perspective view of an embodiment of the drain valve 100. For applications for a roof vent of a plumbing system, the top of the valve can be provided with features that protect and cover the valve. As shown, the drain valve 100 may include a guard 200 that attaches to or otherwise couples with the valve 100. In some embodiments, the guard 200 couples with the top of the upper portion 182 of the valve 100 and in certain embodiments to the valve embodiments described above. The guard 200 can block unwanted foreign objects, such as snow, debris etc., from entering the drain valve 100 while still allowing air to flow in and gases to escape. The guard 200 for example prevents harmful UV rays from striking and degrading the flapper 116 and other components of the vented drain valve 100. The guard 200 can further prevent or inhibit snow or ice to build up and block the drain, for example from blocking the conduit in the drain valve 10 and 100 described herein. If snow or ice builds up on the guard, the water will flow down and off the side edges of the guard. In this manner, melted snow or ice will not flow into the drain and freeze the pipe, blocking air intake. Animal debris can be prevented from flowing into the drain. It is understood that the guard 200, and other features of the valve 100 described herein, may be implemented with any of the embodiments of the valves discussed herein, for instance the valve 10 embodiments described above.

The guard 200 can include one or more openings 210. As shown, the guard 200 includes multiple openings 210 near the center of the guard 200. The openings 210 can extend through a portion of the guard 200 to allow venting with the atmosphere. The openings 210 may be square, circular, or other suitable shapes. Further, the openings 210 may be concentrated in one or more areas of the guard 200. As shown the openings 210 are concentrated near the middle of the guard 200 as illustrated. However, other suitable configurations and locations of the openings 210 can be implemented.

The drain valve 100 may also include a gasket 112. The gasket 112 may be secured on the drain valve 100 underneath the guard 200 and around the upper portion 182. The gasket 112 may provide a sealed interface when the valve 100 is coupled with a drain, pipe or vent. The gasket 112 may further share any of the features and functionalities of the gasket 12 embodiments described above.

The drain valve 100 may include a lower portion 183. The lower portion 183 couples with the upper portion 182. The lower portion 183 is a structure on the lower part of the drain valve 100. The lower portion 183 may include one or more ridges 190. As shown, the lower portion 183 includes multiple ridges 190 along an outside surface of the lower portion 183. The ridges 190 define spaces therebetween. The spacing of the ridges 190 may provide flexibility to the lower portion 183 and may facilitate fitting the drain valve 100 into various sized pipe or vents. The ridges 190 are shown as oriented generally vertically, however, the ridges 190 may be implemented in a variety of configurations.

Figure 12B:
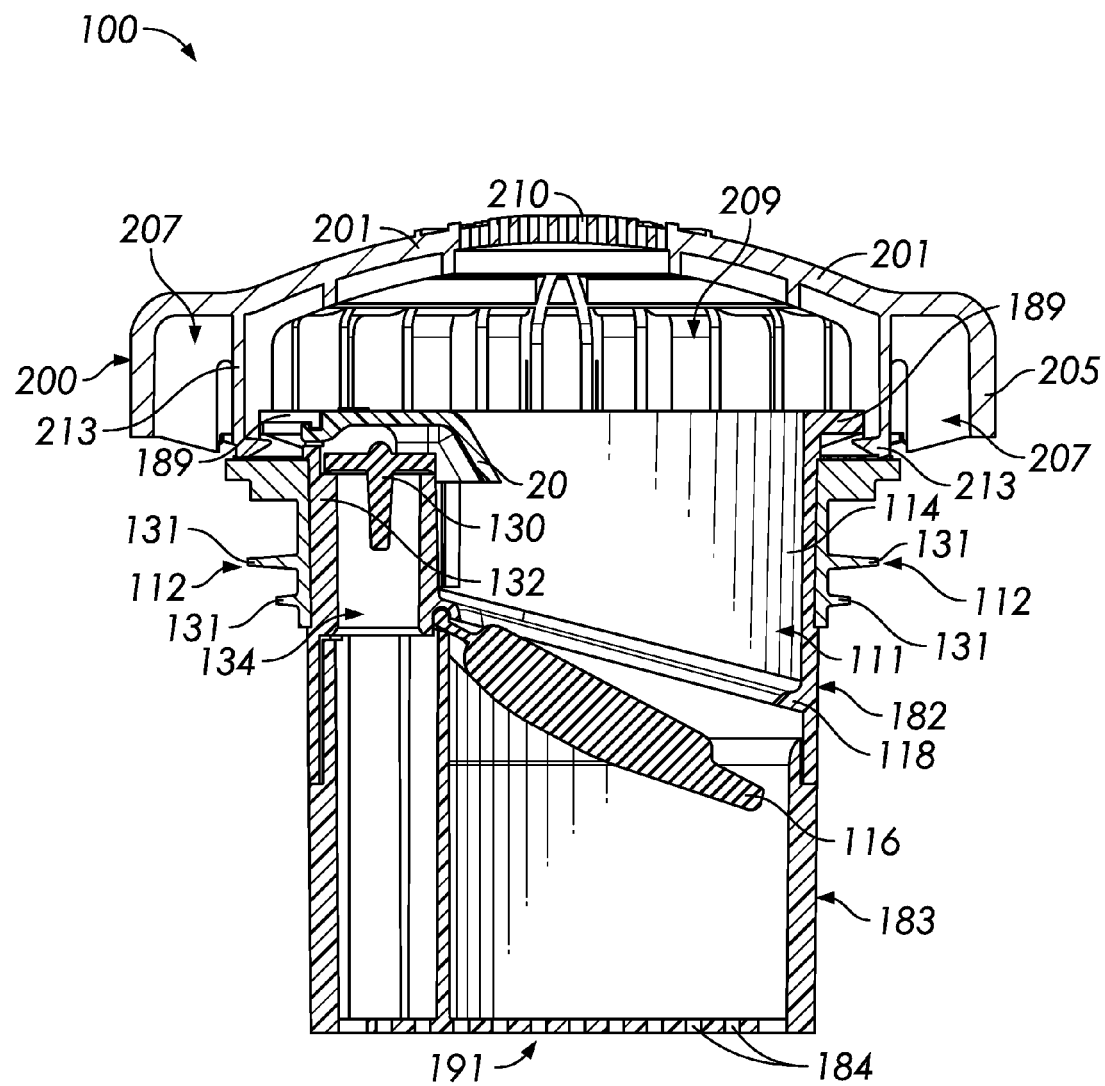
FIG. 12B is a cross-section view of the roof vent valve of FIG. 12A taken along the line 12B-12B as indicated in FIG. 12A.
Figure 12C:
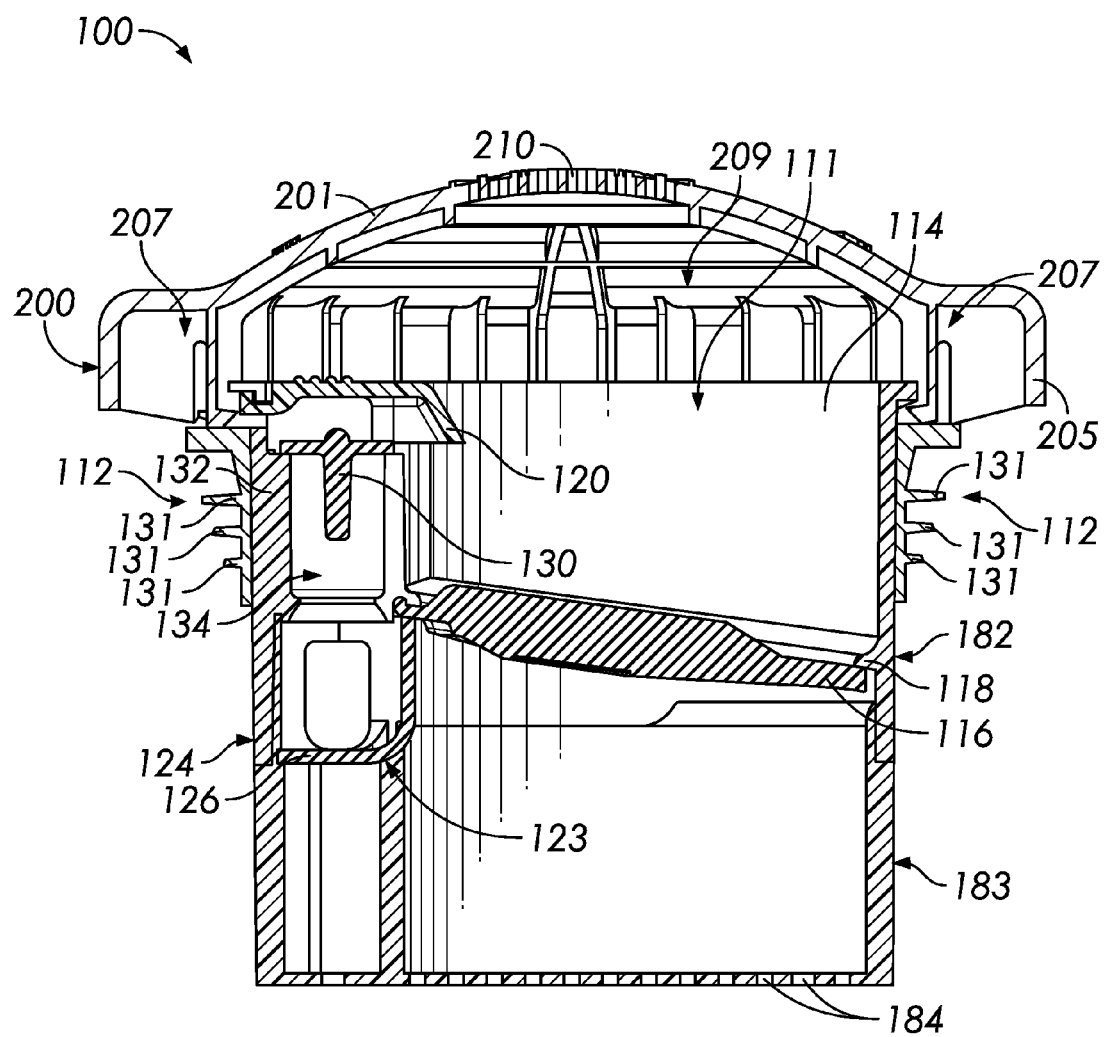
FIG. 12C-12D are cross-section views of other embodiments of a roof vent valve.
Figure 12D:
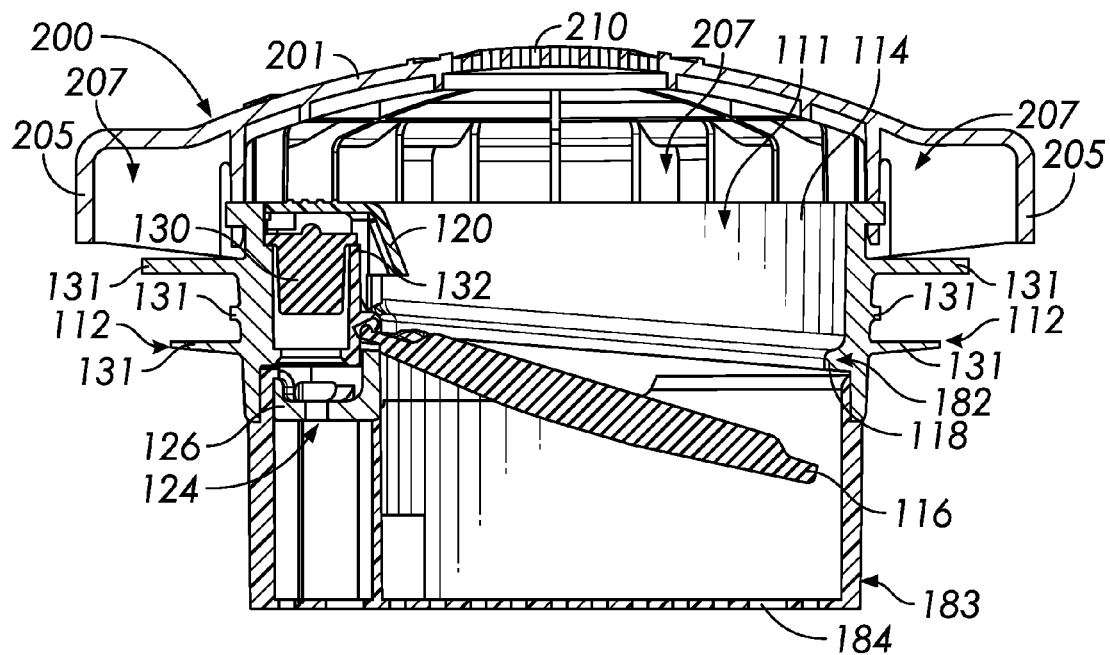

FIGS. 12B, 12C and 12D are cross-section views of the drain valve 100 as taken along the lines 12 B-12B as shown in FIG. 12 A. FIGS. 12B-12D show different embodiments of the drain valve 100.

Referring to FIG. 12 B, the drain valve 100 includes the guard 200 extending over the sides of the upper portion 182. The guard 200 as shown includes a generally circular guard body 201 that provides a structural upper feature of the valve 100. The guard body 201 may be formed from a variety of rigid materials, including plastics, polymers, metals and metal alloys, other suitable materials or combinations thereof. The body 201 may have a variety of features as described herein.

The guard 200 includes an overhang 205. The overhang 205 may be an extension of the body 201 that extends over or generally over the outer sides of the upper portion 182. The overhang 205 as shown includes a generally vertical and a generally horizontal section. However, other configurations may be implemented. For instance, the overhang 205 may include an angled portion in addition to or instead of the horizontal and/or vertical sections. The overhang 205 facilitates directing foreign objects away from the drain valve 100. For example, if snow, leaves or other debris collect on top of the guard 200, the overhang 205 will guide such objects away from the drain valve 100. Further, for example, snow or ice that might collect on top of the guard 200 may eventually melt and will thus be directed to flow down and over the outside of the overhang 205 and away from the drain valve 100. This prevents ice or other debris from entering the valve 100 and possibly freezing or otherwise blocking the fluid passageway(s) through the valve 100.

The guard 200 can also include one or more upper openings 210. The upper openings 210 may be passageways that extend through the body 201 of the guard 200 that allow for fluid (e.g., gases or liquids) flow therethrough. The upper openings 210 may therefore provide a path for venting of fluids (e.g., gases or liquids) from, or into, the valve 100. The upper openings 210 are shown extending generally vertically through the body 201 of the guard 200. However, other suitable arrangements and/or positions of the upper openings 210 may be implemented.

The guard 200 also covers various spaces above the upper portion 182 of the valve 100 to allow for fluid communication therethrough. As shown, the guard 200 can include an overhang space 207 and/or a central space 209. The overhang space 207 may be located along the outer perimeter of the underside of the guard 200. The overhang 205 may form or define the overhang space 207 underneath the overhang 205. Therefore, the overhang space 207 may have a similar shape as the lower surface of the overhang 205. As shown the overhang space 207 in the cross-section view as illustrated has a generally vertical portion and a generally horizontal portion. However, other suitable shapes and sizes of the overhang space 207 may be implemented. The overhang space 207 is in fluid communication with the central space 209. Therefore, fluids such as gases may freely flow between the two spaces. For instance, fluids and gases may travel out of a roof vent or pipe through the drain valve 100, into the central space 209, and through the overhang space 207 and into the atmosphere. Fluids may also travel in the other direction.

The guard 200 may include one or more fingers 213. The fingers 213 are configured to secure the guard 202 with the valve 100, for example by securing to the upper portion 182. The fingers 213 may secure the guard 200 to other portions of the drain valve 100. As shown, the fingers 213 couple with a lip 189. The lip 189 extends generally circumferentially around an upper perimeter of the upper portion 182. The lip 189 projects radially outward and provides a surface to which the fingers 213 are secured. The fingers 213 may be flexible or otherwise resilient and may snap around the lip 189. Therefore, the lower portion of the finger 213 may flex outward in order to fit around the lip 189 and then may flex inward to snap into place. Further details of the guard 200 and finger 213 are described herein, for example with respect to FIGS. 14B-14C. As described herein, in one embodiment, the guard 200 can be snapped or otherwise coupled to valve. In other embodiments, the guard 200 can be coupled to the valve by integrally forming certain parts, fasteners, adhesives, and/or other fastening members. An advantage of the illustrated arrangement in which a snap connection is provided is that the guard 200 can be coupled to valve configured for another purpose (e.g., a floor drain) and by coupling the guard to the valve the same valve can be provided with a guard useful when the valve is used as a roof vent.

As mentioned, the drain valve 100 may include the same or similar features as other embodiments of the drain valve discussed herein, for example the drain valve 10. Accordingly, for similar elements, similar reference numbers will be use with the addition of reference "1" to the earlier used reference number and reference can be made to the description for further details, embodiments and explanations. As shown, the drain valve 100 includes the upper portion 182 secured or otherwise coupled with a lower portion 183. The lower portion 183 may be mechanically coupled with the upper portion 182. In some embodiments, the lower portion 183 may be screwed into, friction fit, bonded, or otherwise mechanically secured with the upper portion 182. The lower portion 183 may include a bottom side 191 having one or more lower openings 184. The bottom side 191 may be a lower wall or surface of the lower portion 183. The bottom side 191 may be generally horizontal as shown, however other orientations may be implemented, such as angled or combinations thereof. The lower openings 184 are formed in the bottom side 191. The lower openings 184 extend through the bottom side 191 to allow fluid communication therethrough. Therefore, fluids such as gases or liquids may travel through the lower openings 184 and into the drain valve 100, and vice versa. The lower openings 184 may have a variety of shapes and sizes, including square, circular, other suitable shapes and combinations thereof. Further, the lower openings 184 may be arranged in a variety of manners, for example concentrated, such as near the center of the bottom side 191 or in other locations, dispersed, and/or combinations thereof.

The drain valve 100 can further include a housing 114 defining part of a main flow channel 111. The drain valve 100 can include a hinged flapper 116, which can be configured similar to the flapper 16 embodiments described above, which is shown in the open position in FIG. 12B. Therefore, the main flow channel 111 is in fluid communication with the lower openings 184 of the lower portion 183 as well as with the central space 209 and the overhang space 207 of the guard 200. Therefore, as shown a continuous fluid passageway is provided through the drain valve 100 in this manner. To open, the flapper 116 rotates downward to allow fluid such as air down into the vent pipe or conduit (see FIGS. 13A-13B). After the fluid flows in, the flapper 116 rotates back up and abuts or otherwise contacts the flapper seat 118, preventing the flapper 118 from further rotating upward. Thus, as used in a roof vent, the flapper 116 can open to allow air to be sucked into the venting system as the valve opens when a negative pressure occurs in the vent system.

The drain valve 100 may further include a pressure release mechanism, where the drain valve 100 also allows gases from inside the pipe to escape if the pressure increases beyond a predetermined limit. Gases in the pipe can flow up into a pressure relief conduit 134 that can include a valve member 130, such as the pressure relief conduct 34 and valve member 30 embodiments described above. The valve member 130 can be gravity assisted and thus will move up with sufficient pressure underneath it. With the valve member 130 moved upward, gases can then flow through the conduit, such as a pipe, and into the pressure relief conduct 134 and eventually escape into the atmosphere. In the illustrated embodiment, the lower portion 183 includes a wall extending from the hinge of the flapper 116 separating a portion of the main conduit from the pressure relief conduct 134. The wall can be used to secure the flapper 116 in place in a manner similar to the mounting clip and ball retainer described above. As described above, under low pressure conditions, the valve member 130 in the pressure relief conduit 134 remains closed and the flapper 116 blocks flow. Thus, under low back pressure situations, the entire drain valve 100 would block or substantially block the release of noxious gases and odors from escaping out of the venting system. The valve 100 may further include a shield 120 over the over the pressure relief conduct 134. These and other features of the drain valve 100 may be similar to analogous features of the drain valve 10 described herein.

The drain valve 100 may also include a gasket 112. As shown in FIG. 12B, the gasket 112 may couple with the upper portion 182 around the outer perimeter of the drain valve 100. The gasket 112 may have one or more sealing projections 131. The gasket 112 may include any number of sealing projections 131 and in a variety of shapes and sizes. As shown, there are two sealing projections 131 with the uppermost sealing projection 131 as illustrated extending radially outward farther than the lower sealing projection 131. This is merely one example, and many different configurations of the gasket 112 may be implemented.

Referring now to FIG. 12 C, another embodiment of the drain valve 100 is shown. The embodiment shown in FIG. 12C may have many of the same or similar features of the drain valve 100 describe with respect to 12 FIG. 12B. However, some of the features of the valve 100 in FIG. 12C may be different. For instance, the gasket 112 includes three outwardly projecting sealing projections 131. The sealing projections 131 each extend radially outward a different distance. As shown, the uppermost sealing projection 131 as illustrated extends the farthest outward while the lowermost sealing projection 131 as illustrated extends the least distance outward. Further shown in FIG. 12C is the flapper 116 in a closed position. The flapper 116 is shown contacting the flapper seat 118 such that fluid flow around the flapper 116 is prevented. Also, the valve 100 can be configured in a manner similar to the valve of FIG. 10A. Thus, the valve 100 of FIG. 12C can include a ball valve 124 (the ball is not shown in FIG. 12C). The ball valve 124 may include a mounting clip 123 and a retainer 126. As described above, a ball valve 124 can be used to prevent high-pressure flows from passing upward through the pressure relief valve. These and other features can be similar to analogous features described with respect to the drain valve 10 described above. Further, the valve 100 of FIG. 12C may include a shorter and/or wider lower portion 183 as compared to the drain valve 100 of FIG. 12B. The different sizes and/or shapes of the lower portion 183, and/or of other parts of the valve 100, may facilitate with coupling the valve 100 to drains, vents or pipes of various sizes. This is merely one example and many different configurations of the various features of the drain valve 100 may be implemented.

FIG. 12 D shows yet another embodiment of the drain valve 100. In this embodiment, the drain valve 100 includes the retainer 126 and can be configured in a manner similar to the embodiment of FIG. 3 above. Thus, this embodiment can include a flapper 116, a pressure relief conduit 134 can include a valve member 130. The valve member 130 may be biased into a closed position by gravity. When the valve member 30 is in a closed position, as shown it can restrict or block passage of fluid past the valve member 130. The drain valve 100 also includes the gasket 112 having two long sealing projections 131 and a single shorter sealing projection 131. As shown, the uppermost sealing projection 131 as illustrated extends radially farther than the lowermost sealing projection 131. In between the longer upper and lower sealing projections 131 is a relatively shorter sealing projection 131. It is further noted that the sealing projections 131 of FIGS. 12B-12D are shown in cross-section view, and that these portions of the sealing portion projections 131 may extend continuously around the entire drain valve 100. However, in some embodiments the sealing projections 131 may only extend partially around the drain valve 100. For instance, the lower sealing projection 131 as illustrated in FIG. 12 D may only extend 180° around the outer perimeter of the drain valve 100. A variety of configurations and shapes of the gasket 112, including the sealing projections 131, may be implemented, and this is merely one example. It is further noted that the flapper 116 is shown in FIG. 12D in the open position.

The drain valve 100 of FIG. 12 D also includes the guard 200 having multiple fingers 213. However, the fingers 213 include openings that allow the fingers 213 two couple with the upper portion 182, as discussed in further detail with respect to FIG. 14 see below.

Figure 12E:
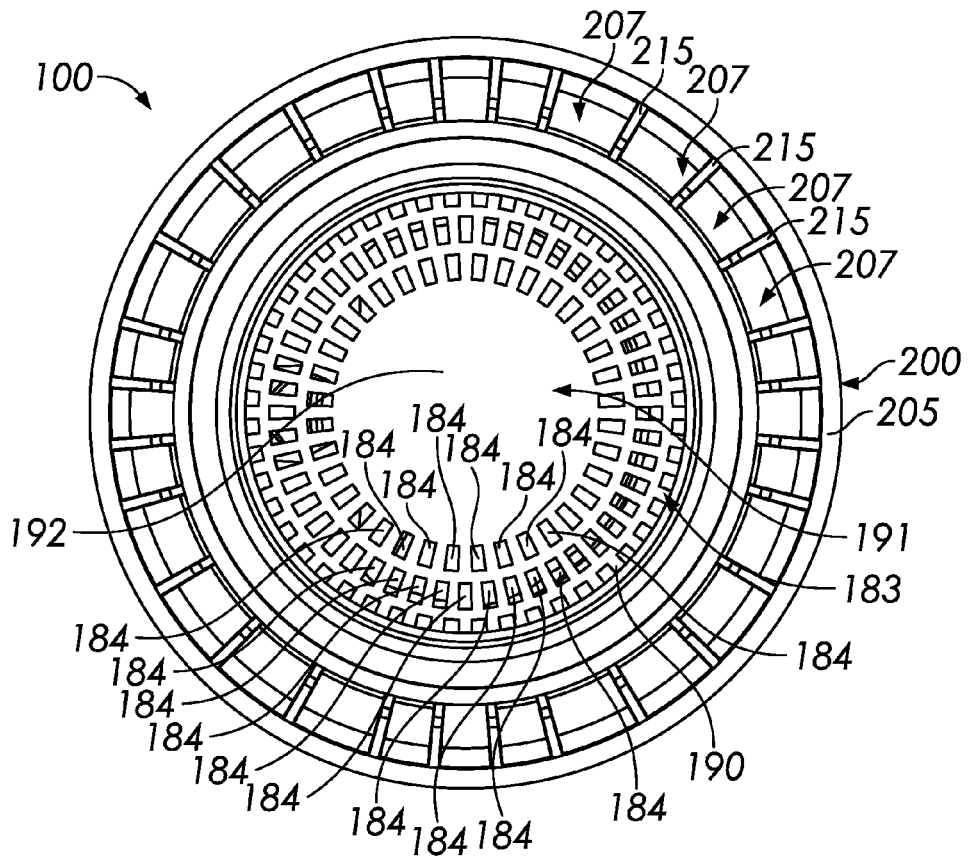
FIG. 12E is a bottom view of the roof vent valve of FIG. 12A.

FIG. 12E is a bottom view of an embodiment of the drain valve 100. As shown, the lower portion 183 is visible near the middle of the figure as illustrated with the guard 200 extending outward along the sides of the lower portion 183. As shown, the lower portion 183 includes the bottom side 191 having a center area 192 surrounded by multiple openings 184. As shown, the center area 192 may be solid and thus prevent fluid flow therethrough. The openings 184 may extend through the bottom side 191 and thus provide fluid communication therethrough. It is noted that only some of the openings 184 are labeled in the figure. As shown, the openings 184 may be located in adjacent, circumferential rows near the outer perimeter of the bottom side 191. This is merely one arrangement and a variety of configurations are possible. For instance, there may be openings 184 near the middle of the bottom side 191, such as in the center area 192. Further shown are multiple ridges 190 along the outside of the lower portion 183. As shown, the ridges 190 have generally square or rectangular shapes, however a variety of shapes may be implemented such as round or otherwise. The ridges 190 extend 360° around the lower portion 183. In some embodiments, the ridges 190 may extend for less than 360° around the lower portion 183. Further, there may be various groups of multiple ridges 190 each located in various areas around the lower portion 183. Therefore, the configuration shown is merely one example and many different configurations may be implemented.

The guard 200 may include one or more ribs 215. The ribs 215 may be structural members on the underside of the guard body 201. The ribs 215 may provide structural stiffness and/or define flow passages. As shown, the ribs 215 extend radially outward to the overhang 205. The ribs 215 may be integral with the guard 200 or they may be form formed as separate parts and then coupled with the guard 200. As shown, the ribs 215 may define the various overhang spaces 207 in between the ribs 215. Therefore, there may be multiple overhang spaces 207. As shown, the overhang spaces 207 extend entirely around the underside of the guard 200. The ribs 215 may extend generally radially inward from the overhang 205. When the guard 200 is coupled with the other features of the drain valve 100, the ribs 215 may contact one or more outer surfaces of those features, such as one or more outer surfaces of the upper portion 182 and/or the housing 114.

Figure 13A:
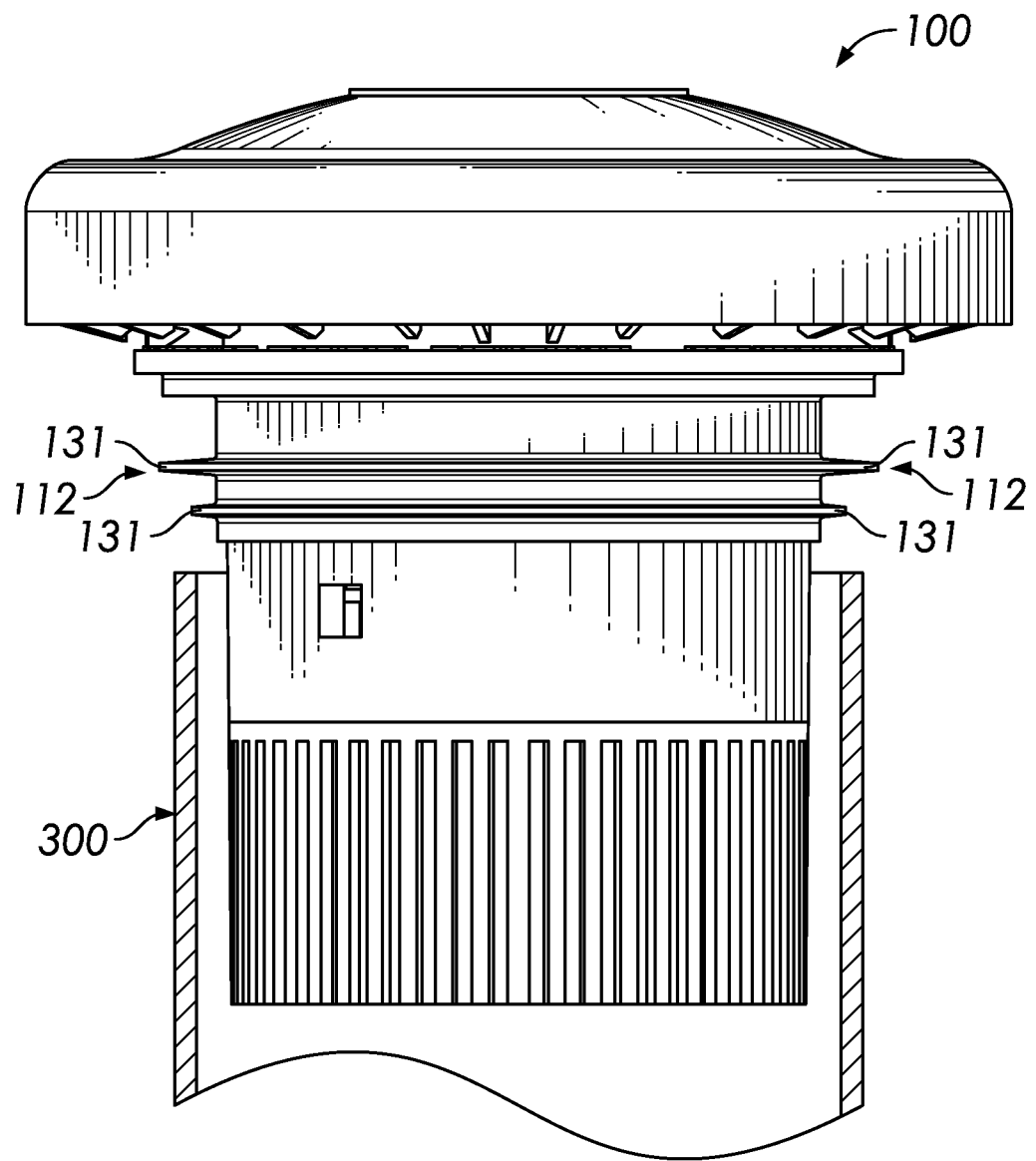
FIGS. 13A-13B are partial cross-section views of a roof vent valve that is partially coupled with a conduit, such as a roof vent.
Figure 13B:
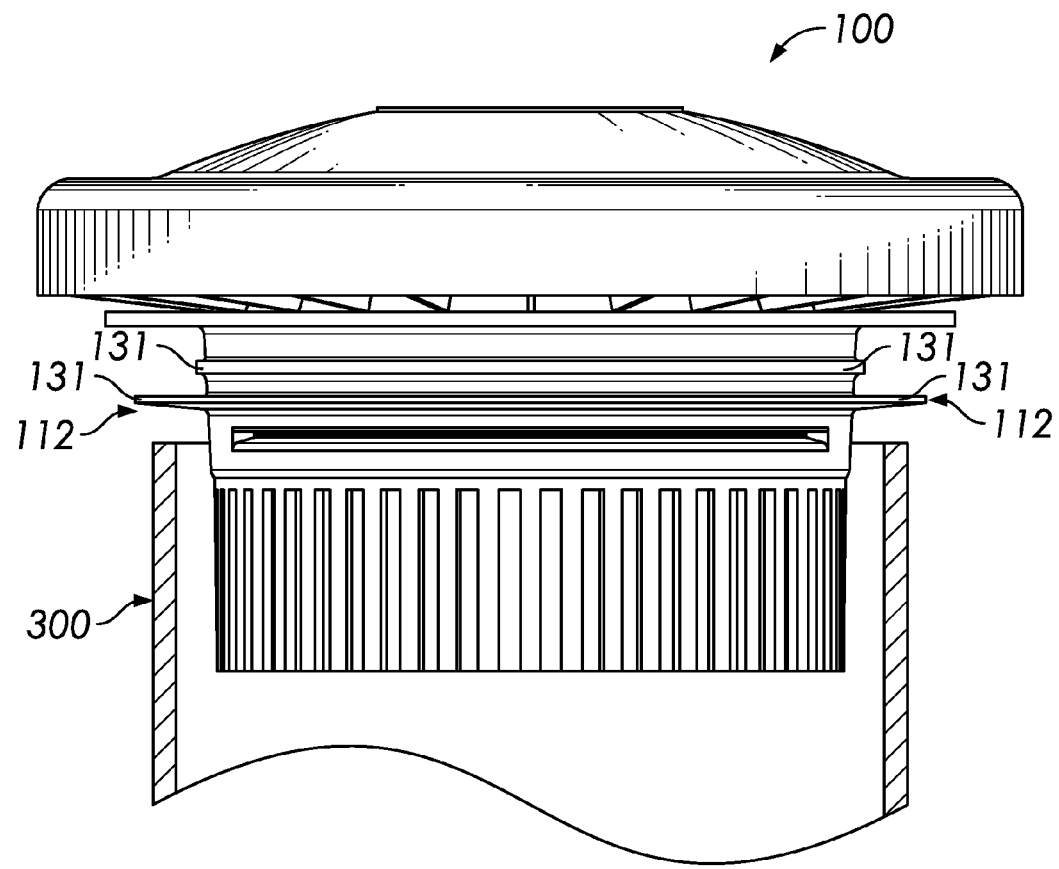

FIGS. 13A-13B show various embodiments of the valve 100 coupled with a conduit 300. The conduit 300 may be a roof vent or vent stack or other such feature to which the valve 100 is coupled. For clarity, the valve 100 is shown from the side and the conduit 300 shown in cross-section. The valve 100 as shown is being lowered into the conduit 300. Therefore, the valve 100 may be received by the conduit 300 such that the gasket 112 contacts the inner surfaces or other surfaces of the conduit 300. For example, the sealing projections 131 of the gasket 112 may bend and flex once the valve 100 has been lowered and secured into place partially within in the conduit 300. Once the valve has been lowered into the conduit 300, portions of the valve 100 may extend inside and/or outside of the conduit 300. For example, when secured to the conduit 300, the guard 200 and or portions of the gasket 112 and upper portion 182 may extend outside of the conduit 300. In this manner, the gasket 112 may provide a sealed interface between the drain valve 100 and the conduit 300 such that fluid communication is prevented between the outside of the drain valve 100 and the inner surfaces of the outside of the conduit 300. This will ensure that any fluids, such as gases or fluids, travel through the interior of the drain valve and are not allowed to escape through the contacting interface between the valve 100 and the conduit 300.

Figure 14A:
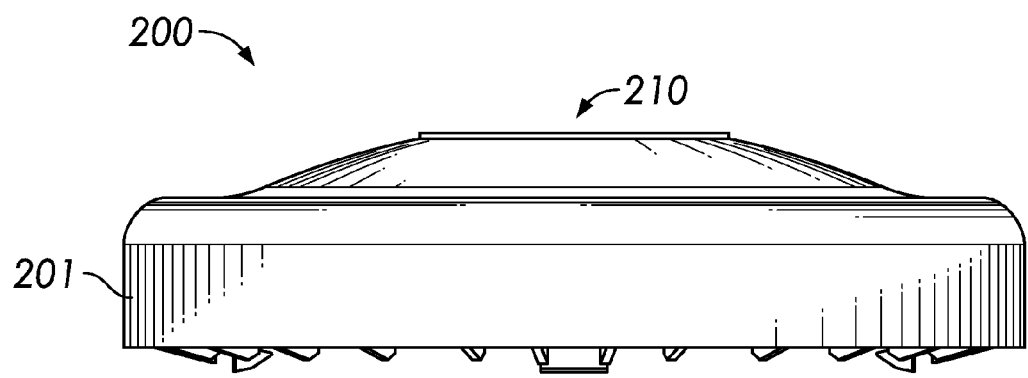
FIG. 14A is a side view of the guard from the roof vent valve of FIG. 12A.
Figure 14B:
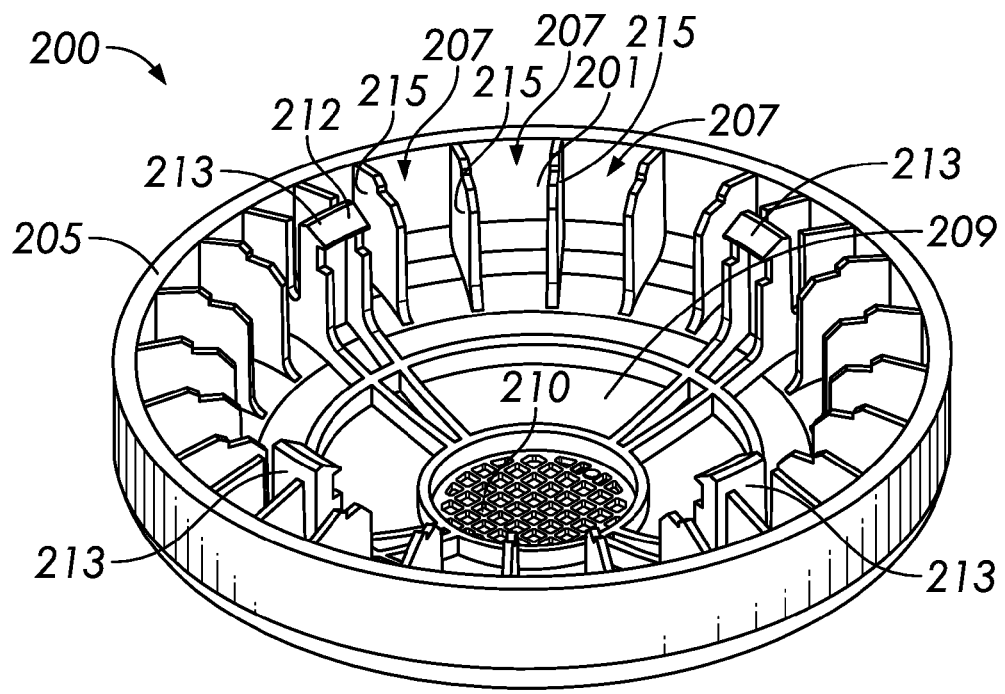
FIG. 14B is a bottom perspective view of the guard of FIG. 14A.
Figure 14C:
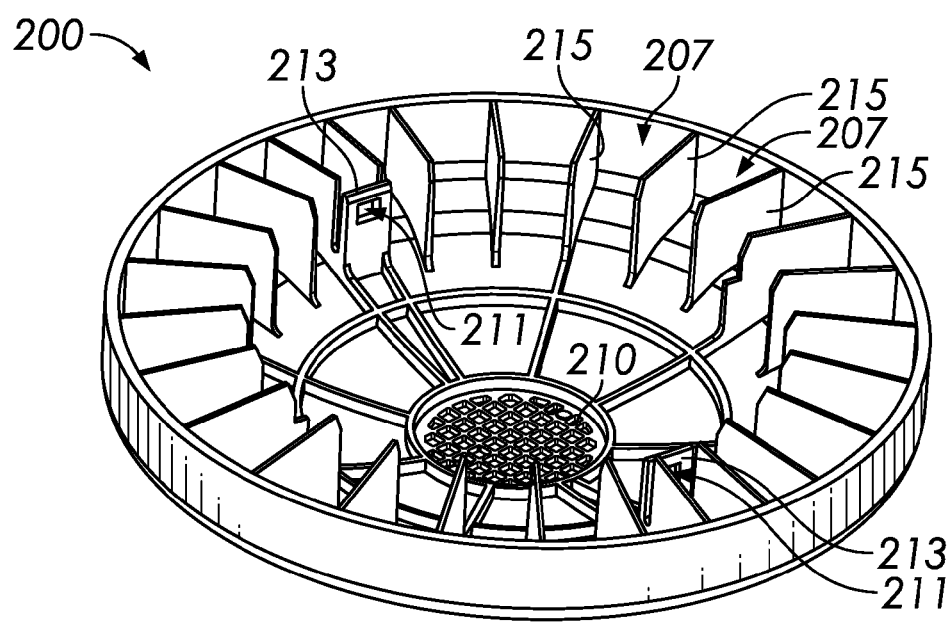
FIG. 14C is a bottom perspective view of another embodiment of a guard.

FIGS. 14A-14C show various views of the guard 200. FIG. 14A is a side view of an embodiment of the guard 200, FIG. 14B is a bottom perspective view of an embodiment of the guard 200, and FIG. 14C is a bottom perspective view of an embodiment of the guard 200. The guard 200 can snap onto or otherwise couple with the top of a vented drain of a plumbing system. The underside of the guard 200 may have one or more fingers 213 with inward-projecting flanges on the ends. The fingers 213 can flex to fit around a corresponding outward flange of the drain valve 100 to snap into place, as discussed herein.

As shown in FIG. 14A, the guard 200 may have a guard body 201 that is generally elongated in the horizontal direction and is shorter in the vertical dimension as oriented. However, other aspect ratios or proportions of the various dimensions of the guard 200 may be implemented and are within the scope of the present disclosure. It is further noted that the openings 210 are located near the top of the upper curved surface of the guard body 201. However, the openings 210 may be in a variety of locations. Further, the upper surface of the body 201 may be generally curved as shown, or it may have a variety of other shapes, or be combinations thereof.

As shown in FIG. 14B, the guard 200 may include four of the fingers 213. The fingers 213 may be located generally 90° angularly apart from each other. However, other locations of the fingers 213 may be implemented. The fingers 213 may include projections 212. The projections 212 may project or otherwise extend radially inward. The projections 212 may provide a surface or surfaces with which other features of the drain valve 100 may couple in order to secure the guard 200. For example, the projections 212 may couple with the lip 189 shown in FIG. 12B. The fingers 213 further include a notch 214. The notch 214 may be formed from the projection 212 and a lower portion of the finger 213. In some embodiments, the lip 189 of the upper portion 182 of the valve 100 may be received into the notch 214. Therefore, the finger 213 may flex outward when being secured over the upper portion 182 and may then flex back inward to snap over the lip 189 and thereby secure the guard 200 into place.

As shown in FIG. 14C, the guard 200 may include the fingers 213 having one or more openings 211 therethrough. As shown, the openings 211 are generally square or rectangular openings extending through a generally planar finger 213. However, other shapes, sizes and locations of the openings 211 may be implemented. The openings 211 may receive various features of the valve in order to secure the guard 200 thereto. For example, the openings 211 may receive the lip 189, as shown in FIG. 12D. The lip 189 may therefore be an outwardly extending projection sized to fit through the openings 211 of the fingers 213. As shown in FIG. 14C, there are two fingers 213 located generally opposite each other. However, there may be any number of fingers 213 and in a variety of locations. This is merely one example and many other configurations are possible.

In the embodiments described above, the flapper can have an equilibrium position, as illustrated, in which the sealing portion and attachment portion are at an angle α relative to each other. However, in modified embodiments of the embodiments described herein, the flapper can be positioned at no angle or at different angles to the embodiments described above. Many of the embodiments described above also include a pressure equalization conduit with a valve member and/or back flow valve in the pressure equalization conduit. However, in modified embodiments of the embodiments described above, the valve can be provided without a valve member and/or back flow valve in the pressure equalization conduit. It is also anticipated that in modified embodiments of the valves described above that different forms of the illustrated valves (e.g., flapper, weight/gravity and ball valves) can be used such as ball valves, check valves, duck bill valves, flapper valves, umbrella valves, etc. The roof vent valves of FIGS. 12A-14C can also be used in other applications such as various ventilation, heating, air conditioning systems.

The terms "approximately", "about", and "substantially" as used herein represent an amount or characteristic close to the stated amount or characteristic that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount or characteristic.

Additionally, the term "closed" when used with reference to a valve preventing or blocking passage of fluid through the valve is used broadly and includes its ordinary and customary meaning. In certain embodiments, it means allowing within less than 1% of, within less than 0.1% of, and/or within less than 0.01% of, and in certain embodiments 0% of the flow that would pass through the valve in the open position during anticipated operating conditions. In some embodiments, the term closed when used with reference to preventing passage of fluid through a valve means that the valve allows some fluid passage at lower pressures but completely blocks fluid passage above a minimum pressure. For example, in some embodiments it can mean completely blocking fluid passage above the minimum pressure of 0.2 psi, 0.5 psi, or 1.0 psi. In some embodiments, it can mean completely blocking fluid passage at pressures above the minimum pressures and up to a maximum pressure of at least 6 psi, 7 psi, 8 psi, or greater.

Although the foregoing description of the preferred embodiments has shown, described and pointed out the fundamental novel features of the inventions, it will be understood that various omissions, substitutions, and changes in the form of the detail of the apparatus as illustrated as well as the uses thereof, may be made by those skilled in the art, without departing from the spirit of the inventions.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments. For example, various embodiments of flapper valves described herein can be used with various housings, with embodiments that do not include a ball valve, with embodiments that do include a ball valve, etc. Similarly, as a further example, the various gasket embodiments (including gaskets with sealing projections and/or inflatable membranes) can be used with the various flapper and valve embodiments.

Similarly, it should be appreciated that in the above description of embodiments, various features of the inventions are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A valve for a roof vent comprising:
   a housing configured to couple with a roof vent conduit, the housing including an inlet, an outlet, a circumferential valve seat, and a flow channel passing through the valve and through the valve seat;
   a flapper mounted within the housing and having a first side facing a first side of the valve and a second side facing a second side of the valve, the flapper biased toward a closed position in which a sealing portion on the first side of the flapper engages with the valve seat to thereby block at least a portion of backflow through the flow channel, wherein the flapper is configured such that a minimum pressure on the first side of the flapper moves the flapper to an open position in which gas can flow through the flow channel;
   a pressure equalization conduit fluidly connecting a first side of the valve on the first side of the flapper with a second side of the valve on the second side of the flapper;
   a valve member within the pressure equalization conduit, the valve member configured to move from a closed position that substantially blocks fluid transfer between the first and second sides of the valve to an open position when a pressure on the second side of the valve exceeds a first defined pressure, thereby allowing the pressure on the second side of the valve to bleed into the first side of the valve.

2. The valve for a roof vent of claim 1, further comprising a guard configured to couple with the first side of the valve, the guard comprising a guard body that at least partially covers the first side of the valve when the guard is coupled with the first side of the valve.

3. The valve for a roof vent of claim 2, wherein the guard body comprises an elongated portion that extends at least partially over the flow channel of the valve when the guard is coupled with the first side of the valve.

4. The valve for a roof vent of claim 1, wherein the flapper is configured to rotate from the closed position to the open position about a single hinge on one radial side of the flow channel.

5. The valve for a roof vent of claim 1, further comprising a shield connected to the housing and configured to cover the pressure equalization conduit.

6. The valve for a roof vent of claim 1, wherein the flapper comprises an attachment portion and the housing comprises a flapper mount configured to receive the attachment portion, and wherein the flapper further comprises a resilient hinge connecting the attachment portion of the flapper and the sealing portion of the flapper, the resilient hinge biasing the flapper into the closed position.

7. The valve for a roof vent of claim 6, further comprising a backflow valve in fluid communication with the pressure equalization conduit, the backflow valve configured to allow backflow of fluid through the pressure equalization conduit below a second defined pressure and to substantially block backflow of fluid through the pressure equalization conduit above a second defined pressure, wherein the second defined pressure is greater than the first defined pressure.

8. A method of providing venting to a plumbing system comprising coupling the valve of claim 1 with a vent stack of the plumbing system.

9. The valve for a roof vent of claim 1, further comprising an overhang coupled with an elongate portion and that extends at least partially over an outer perimeter of the housing when a guard is coupled with the first side of the valve.

10. The valve for a roof vent of claim 9, wherein the overhang at least partially defines an overhang space thereunder and the elongated portion at least partially defines a central space thereunder, wherein the overhang space, the central space and the flow channel of the valve are in fluid communication with each other when the guard is coupled with the first side of the valve.

11. The valve for a roof vent of claim 10, wherein the elongate portion comprises one or more openings extending through a guard body.

12. The valve for a roof vent of claim 1, wherein a guard further comprises one or more fingers coupled with and extending from the guard, the one or more fingers configured to couple the guard with the first side of the valve.

13. The valve for a roof vent of claim 12, wherein the one or more fingers are flexible and are configured to flex to couple the guard with the housing of the valve.

14. The valve for a roof vent of claim 13, wherein the one or more fingers comprise a projection on an end of the one or more fingers, the projection at least partially defining a notch, the notch configured to receive a portion of the valve when the guard is coupled with the valve.

15. The valve for a roof vent of claim 13, wherein the one or more fingers comprise a finger opening extending through the one or more fingers, the finger opening configured to receive a portion of the valve when the guard is coupled with the valve.

16. The valve for a roof vent of claim 15, wherein the guard further comprises:
   an elongated portion of the guard body that extends at least partially over the flow channel of the valve when the guard is coupled with the first side of the valve;
   an overhang of the guard body coupled with the elongate portion and that extends at least partially over an outer perimeter of the housing when the guard is coupled with the first side of the valve,
   wherein the overhang at least partially defines an overhang space thereunder and the elongated portion at least partially defines a central space thereunder, wherein the overhang space, the central space and the flow channel of the valve are in fluid communication with each other when the guard is coupled with the first side of the valve, and
   wherein the elongate portion comprises one or more openings extending through the guard body.

17. The valve for a roof vent of claim 14, wherein the guard further comprises:
   an elongated portion of the guard body that extends at least partially over the flow channel of the valve when the guard is coupled with the first side of the valve;
   an overhang of the guard body coupled with the elongate portion and that extends at least partially over an outer perimeter of the housing when the guard is coupled with the first side of the valve,
   wherein the overhang at least partially defines an overhang space thereunder and the elongated portion at least partially defines a central space thereunder, wherein the overhang space, the central space and the flow channel of the valve are in fluid communication with each other when the guard is coupled with the first side of the valve, and
   wherein the elongate portion comprises one or more openings extending through the guard body.

18. A valve for a roof vent comprising:
a valve housing comprising an inlet and an outlet;
a one way valve positioned within the valve housing, the one way valve configured to restrict backflow through a flow channel of the housing from a second side of the one way valve to a first side of the one way valve while allowing fluid to flow through the flow channel of the housing from the first side of the one way valve to the second side of the one way valve;
a pressure equalization conduit fluidly connecting the first side of the one way valve to the second side of one way valve; and
a valve member configured to move from a closed position, that restricts fluid transfer through the pressure equalization conduit between the first and second sides of the one way valve, to an open position when a pressure on the second side of the one way valve exceeds a first defined pressure, thereby allowing the pressure on the second side of the one way valve to bleed into the first side of the one way valve.

19. The valve for a roof vent of claim 18, wherein the one way valve comprises a sealing membrane, and wherein the sealing membrane comprises a resilient hinge configured to bias the sealing membrane into a position to restrict backflow through the housing.

20. The valve for a roof vent of claim 18, wherein the valve housing is radially expandable to lock the valve within a roof vent.

21. The valve for a roof vent of claim 18, wherein the one-way valve allows GAS to flow through the flow channel of the housing when the one-way valve is in an open position, and wherein the one-way valve has a maximum open position in which a maximum rate of GAS flow can pass through the flow channel.

22. A method of providing venting to a plumbing system comprising coupling a one way valve with a vent stack of the plumbing system, wherein the one way valve comprises a pressure equalization conduit fluidly connecting a first side of the one way valve to a second side of one way valve, further comprising a valve member configured to move from a closed position, that restricts fluid transfer through the pressure equalization conduit between the first and second sides of the one way valve, to an open position when a pressure on the second side of the one way valve exceeds a first defined pressure, thereby allowing the pressure on the second side of the one way valve to bleed into the first side of the one way valve, and wherein the one way valve is a flapper valve.

* * * * *